(12) United States Patent
Inoue

(10) Patent No.: US 9,327,351 B2
(45) Date of Patent: May 3, 2016

(54) CUTTING INSERT, CUTTING TOOL, AND METHOD OF PRODUCING MACHINED PRODUCT USING THEM

(71) Applicant: KYOCERA CORPORATION, Kyoto-shi, Kyoto (JP)

(72) Inventor: Yoshihiro Inoue, Omihachiman (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 14/411,534

(22) PCT Filed: Jun. 28, 2013

(86) PCT No.: PCT/JP2013/067786
§ 371 (c)(1),
(2) Date: Dec. 29, 2014

(87) PCT Pub. No.: WO2014/003161
PCT Pub. Date: Jan. 3, 2014

(65) Prior Publication Data
US 2015/0158089 A1    Jun. 11, 2015

(30) Foreign Application Priority Data

Jun. 29, 2012   (JP) ................................. 2012-147848
Feb. 28, 2013   (JP) ................................. 2013-038319

(51) Int. Cl.
*B23B 27/14*   (2006.01)
*B23B 27/04*   (2006.01)
*B23B 29/04*   (2006.01)

(52) U.S. Cl.
CPC ............. *B23B 27/143* (2013.01); *B23B 27/045* (2013.01); *B23B 29/043* (2013.01);
(Continued)

(58) Field of Classification Search
CPC .... B23B 27/141; B23B 27/45; B23B 27/143; B23B 2200/049; B23B 2200/081; B23B 2200/121; B23B 2200/369; Y10T 82/10; Y10T 407/22; Y10T 407/24
See application file for complete search history.

(56) References Cited

U.S. PATENT DOCUMENTS 4,832,541 A * 5/1989 Noguchi ............... B23B 27/045
                                                                407/114
5,511,911 A   4/1996 Katbi et al.
(Continued)

FOREIGN PATENT DOCUMENTS

DE   19523129 A1   1/1996
EP    1980348 A2  10/2008
(Continued)

OTHER PUBLICATIONS

International Search Report issued in the corresponding PCT International Application No. PCT/JP2013/067786, dated Sep. 17, 2013, 1 page.
(Continued)

*Primary Examiner* — Will Fridie, Jr.

(57) ABSTRACT

A cutting insert includes an end cutting edge located along an intersection of an upper surface and a front clearance surface, and a pair of side cutting edges respectively located along intersections of the upper surface and a pair of side clearance surfaces. The upper surface includes an end rake surface that is continuous with and inclined downward as departing from the end cutting edge, a pair of major protrusions that are less apart from each other as departing from the end cutting edge in a top view, and a pair of minor protrusions that are respectively located close to their adjacent side clearance surface of the pair of side clearance surfaces with respect to the pair of major protrusions. The pair of minor protrusions are located further apart from the end cutting edge than an end portion of each of the pair of major protrusions.

15 Claims, 21 Drawing Sheets

(52) U.S. Cl.
CPC ..... *B23B2200/049* (2013.01); *B23B 2200/081* (2013.01); *B23B 2200/321* (2013.01); *B23B 2200/369* (2013.01); *Y10T 82/10* (2015.01); *Y10T 407/22* (2015.01); *Y10T 407/24* (2015.01)

(56) References Cited

U.S. PATENT DOCUMENTS

| | | | | |
|---|---|---|---|---|
| 7,488,143 B2 * | 2/2009 | Muren | ................ | B23B 27/007 407/113 |
| 7,909,546 B2 * | 3/2011 | Nada | ................ | B23B 27/065 407/113 |
| 8,573,905 B2 * | 11/2013 | Hecht | ................ | B23C 5/06 407/113 |
| 8,777,524 B2 * | 7/2014 | Choi | ................ | B23C 5/109 407/113 |
| 8,905,686 B2 * | 12/2014 | Hausmann | ................ | B23C 5/00 407/113 |
| 9,168,588 B2 * | 10/2015 | Kaufmann | ................ | B23B 27/045 |
| 2007/0071559 A1 * | 3/2007 | Koskinen | ................ | B23B 27/16 407/34 |
| 2008/0240874 A1 | 10/2008 | Nagaya et al. | | |
| 2008/0240875 A1 | 10/2008 | Nagaya et al. | | |
| 2008/0260476 A1 | 10/2008 | Ishida | | |
| 2010/0067992 A1 * | 3/2010 | Uchijo | ................ | B23B 27/007 407/100 |
| 2010/0316452 A1 | 12/2010 | Ishida | | |
| 2011/0182680 A1 * | 7/2011 | Cohen | ................ | B23B 27/007 407/102 |
| 2013/0183109 A1 * | 7/2013 | Fujii | ................ | B23B 27/045 407/100 |
| 2013/0294854 A1 * | 11/2013 | Lee | ................ | B23B 27/16 407/101 |

FOREIGN PATENT DOCUMENTS

| | | |
|---|---|---|
| JP | H02106204 A | 4/1990 |
| JP | 2003011005 A | 1/2003 |
| JP | 2006150584 A | 6/2006 |
| JP | 2006289600 A | 10/2006 |
| JP | 2008272923 A | 11/2008 |

OTHER PUBLICATIONS

European Search Report issued in the corresponding European patent application No. 13808926.3 dated Jan. 27, 2016.

* cited by examiner

CUTTING INSERT, CUTTING TOOL, AND METHOD OF PRODUCING MACHINED PRODUCT USING THEM

RELATED APPLICATIONS

The present application is a national stage entry according to 35 U.S.C. §371 of PCT application No.: PCT/JP2013/067786 filed on Jun. 28, 2013, which claims priority from Japanese application No.: 2012-147848 filed on Jun. 29, 2012, and Japanese application No.: 2013-038319 filed Feb. 28, 2013 and are incorporated herein by reference in its entirety.

TECHNICAL FIELD

The present invention relates to a cutting insert, a cutting tool, and a method of producing a machined product using them.

BACKGROUND ART

As an example of cutting inserts usable for a grooving process or the like, Patent document 1 discloses a grooving tool. For example, in FIGS. 14 to 16 of Patent document 1, a plurality of breaker projections are formed and the height of these projections is increased stepwise as departing from an end flank surface. Specifically, the height of the projections is increased stepwise in the following order: the first stage projection, the second stage projection, and the third stage projection as departing from the end flank surface. In FIGS. 15 and 16 of Patent document 1, an auxiliary projection higher than the first stage projection is interposed between the first stage projection and the second stage projection. The auxiliary projection is used for discharging chips when a cutting process, which is called a cross-feed process in a direction perpendicular to a groove direction, is performed in the grooving process.

In the above grooving tool, however, the height of the projections is increased stepwise as departing from the end flank surface. Therefore, for example, when a workpiece is subjected to the grooving process and a cut-off process, chips may climb over the first stage projection and collide with the auxiliary projection, thus damaging the auxiliary projection. Therefore, when the workpiece after being subjected to these processes is then subjected to a chamfering process, or a process of cutting a wall surface on one side of a groove by using one end portion of an end cutting edge in order to increase a groove width, there has been a risk that the chips could not be sufficiently discharged due to the auxiliary projection.

Hence, there is a need for a cutting insert having excellent chip discharge performance in the grooving process and the cross-feed process.

Patent Document 1: Japanese Unexamined Patent Publication No. 2006-150584

SUMMARY OF THE INVENTION

A cutting insert according to an embodiment of the present invention includes an upper surface, a side surface including a front clearance surface and a pair of side clearance surfaces adjacent to the front clearance surface, an end cutting edge located along an intersection of the upper surface and the front clearance surface, and a pair of side cutting edges respectively located along intersections of the upper surface and the pair of side clearance surfaces. The upper surface includes an end rake surface that is continuous with the end cutting edge and is inclined downward as departing from the end cutting edge, a pair of major protrusions that are located apart from the end cutting edge and are less apart from each other as departing from the end cutting edge in a top view, and a pair of minor protrusions that are located close to their adjacent side clearance surface of the pair of side clearance surfaces with respect to the pair of major protrusions in the top view. The pair of minor protrusions are located further apart from the end cutting edge than an end portion of each of the pair of major protrusions which is close to the end cutting edge, and a top portion of each of the pair of minor protrusions is lower than a top portion of each of the major protrusions.

A cutting tool according to an embodiment of the present invention includes the cutting insert and a holder configured to attach the cutting insert thereto.

A method of producing a machined product according to an embodiment of the present invention includes bringing any one of the end cutting edge, the pair of minor cutting edges, and the corner cutting edge of the cutting tool into contact with a workpiece being rotated, and separating the cutting tool and the workpiece from each other.

PREFERRED EMBODIMENTS FOR CARRYING OUT THE INVENTION

Cutting Insert

First Embodiment

A cutting insert according to a first embodiment of the present invention is described in detail below with reference to FIGS. 1 and 2 and FIGS. 4 to 7.

Figure 1A:
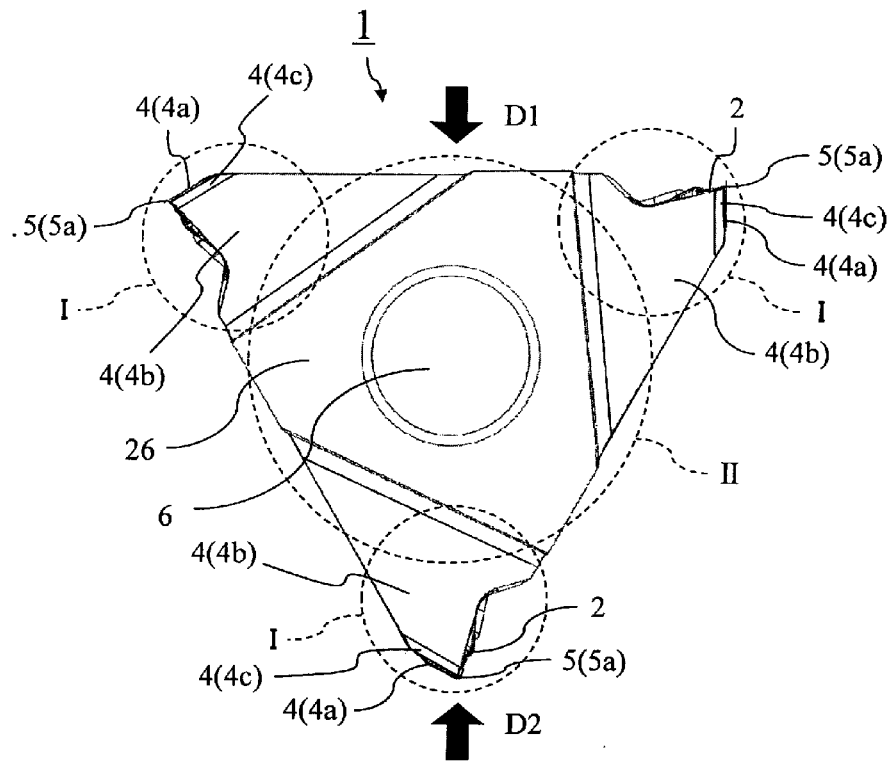
FIG. 1A is a side view of a cutting insert according to a first embodiment of the present invention.
Figure 1B:
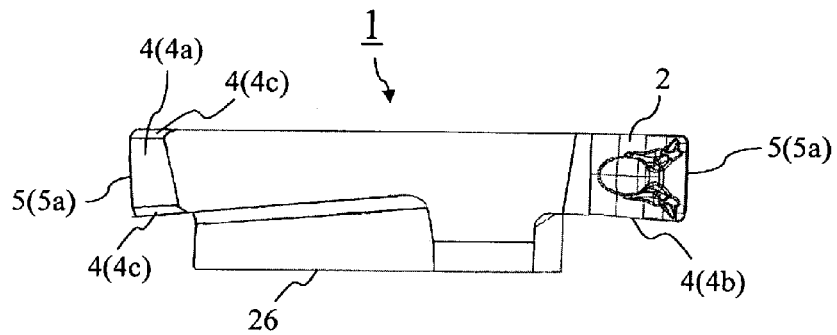
FIG. 1B is a top view of the cutting insert shown in FIG. 1A taken in the direction of arrow D1.
Figure 1C:
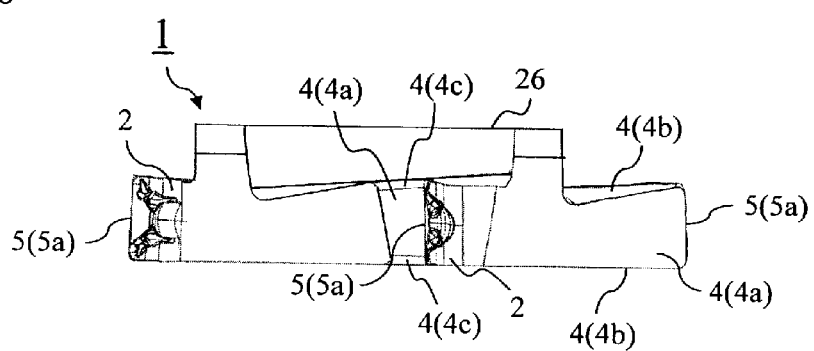
FIG. 1C is a plan view of the cutting insert shown in FIG. 1A taken in the direction of arrow D2.

FIG. 1A is a side view of the cutting insert 1 according to the first embodiment of the present invention. FIG. 1B is a top view of the cutting insert 1 taken in the direction of arrow D1 in FIG. 1A. FIG. 1C is a plan view of the cutting insert 1 taken in the direction of arrow D2 in FIG. 1A.

The cutting insert 1 (hereinafter generally referred to simply as the insert 1) is an approximately triangular plate-shaped body as shown in FIG. 1A, and is used in such an orientation that an approximately triangular portion defines a side clearance surface. The cutting insert 1 includes three cutting sections I respectively located at corner portions thereof, and an attachment section II located at a middle portion thereof. The insert 1 of the present embodiment is usable for an internal grooving process, an external grooving process, and a cut-off process, and is also usable for a process for increasing a groove width and a chamfering process.

For example, cemented carbide or cermet is usable as a material of the cutting insert 1. Examples of the composition of cemented carbide include WC—Co produced by adding cobalt (Co) powder to tungsten carbide (WC), followed by sintering, WC—TiC—Co produced by adding titanium carbide (TiC) to WC—Co alloy, and WC—TiC—TaC—Co produced by adding tantalum carbide (TaC) to WC—TiC—Co. The cermet is a sintered composite material obtained by compositing metal with a ceramic ingredient. Examples of the cermet include ones composed mainly of a titanium based compound, such as titanium carbide (TiC) and titanium nitride (TiN).

The surface of the cutting insert 1 formed of the foregoing material may be coated with a film by a chemical vapor deposition (CVD) method or a physical vapor deposition (PVD) method. Examples of the composition of the film to be coated includes titanium carbide (TiC), titanium nitride (TiN), titanium carbonitride (TiCN), and alumina ($Al_2O_3$).

The size of the insert 1 is not particularly limited. In the present embodiment, a widthwise length of the insert 1 indicated by a vertical length in FIG. 1B is set to 1 to 8 mm, and a longitudinal length of the insert 1 indicated by a lateral length in FIG. 1B is set to approximately 10 to 15 mm.

Figure 2:
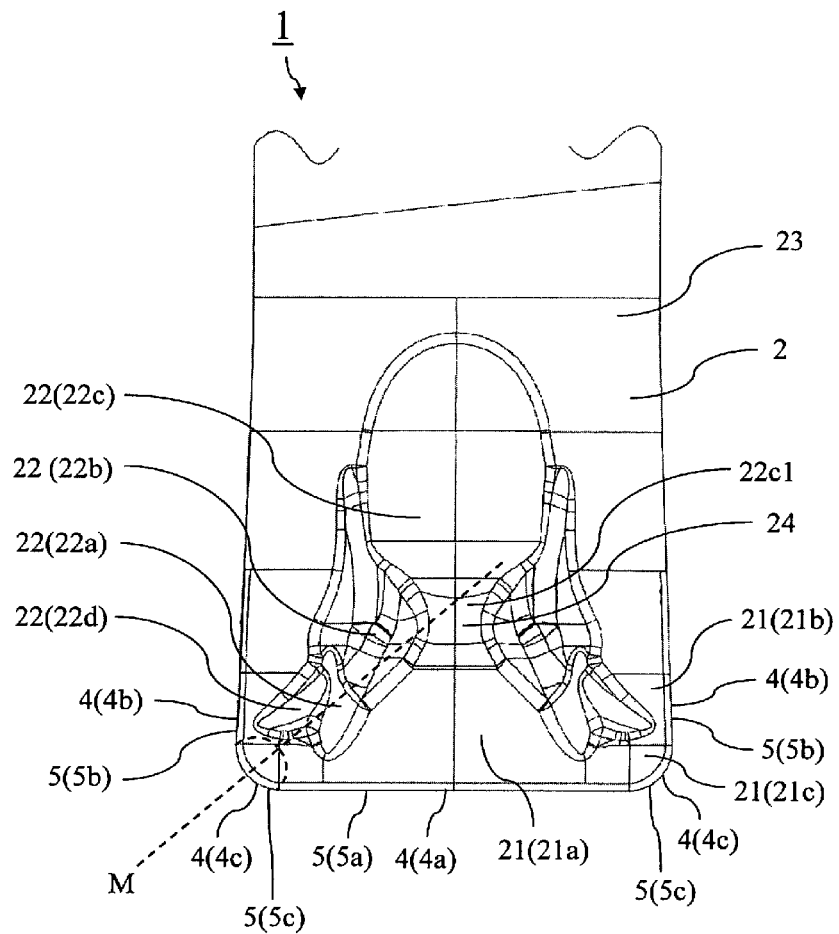
FIG. 2 is a top view showing in enlarged dimension a part of the cutting insert shown in FIG. 1A.

FIG. 2 is a top view showing in enlarged dimension the cutting sections I of the cutting insert 1 shown in FIG. 1A.

Each of the cutting sections I of the present embodiment includes an upper surface 2 and a side surface 4 connected to the upper surface 2. A part of the upper surface 2 functions as a rake surface, and the side surface 4 functions as a flank surface. The side surface 4 includes a front clearance surface 4a located close to the front, and a pair of side clearance surfaces 4b adjacent to the front clearance surface 4a.

A pair of corner clearance surfaces 4c are respectively disposed between the front clearance surface 4a and the pair of side clearance surfaces 4b. As shown in FIG. 1A, the attachment section II includes a through hole 6 and an attachment surface 26 surrounding the circumference of the through hole 6. The attachment surface 26 of the attachment sections II is adjacent to the side clearance surfaces 4b of the cutting section I. The through hole 6 functions as a hole that permits insertion of a screw. The attachment surface 26 is brought into contact with a holder upon attachment to the holder, and functions as a mounting surface to be mounted on the holder.

A cutting edge 5 is located along an intersection of the upper surface 2 and the side surface 4. The insert 1 of the present embodiment includes, as the cutting edge 5, an end cutting edge 5a, a pair of side cutting edges 5b, and a pair of curvilinear corner cutting edges 5c. The end cutting edge 5a is located along a widthwise intersection of each of the cutting sections I, namely, an intersection of the upper surface 2 and the front clearance surface 4a. The pair of side cutting edges 5b are respectively located along intersections of the upper surface 2 and the pair of side clearance surfaces 4b. The pair of curvilinear cutting edges 5c are respectively located between the end cutting edge 5a and the pair of side cutting edges 5b, and connect the end cutting edge 5a and the pair of side cutting edges 5b. The pair of corner cutting edges 5c have a curvilinear shape in the top view. In the present embodiment, the end cutting edge 5a has a straight line shape when viewed from the front clearance surface 4a.

The upper surface 2 includes a rake surface 21, a protrusion 22, and a rising surface 23. The rake surface 21 is located inside the cutting edge 5. The protrusion 22 is located on the rake surface 21. The rising surface 23 is at least partially located further apart from the end cutting edge 5a than the protrusion 22, and is inclined upward as departing from the cutting edge 5a.

The upper surface 2 has the rake surface 21 inside the cutting edge 5. The rake surface 21 has a role in guiding chips in a discharge direction while allowing chips to slidingly pass therethrough.

The rake surface 21 may include a land portion. The term "land portion" is the portion of the cutting section I which extends along the cutting edge 5 on the upper surface 2, and corresponds to a narrow band-shaped region having an approximately constant width. The inclusion of the land portion enhances the strength of the front end of the cutting edge 5 so as to suppress fracture of the cutting edge 5. The land portion may be parallel to a horizontal plane L, or may be inclined downward as departing from the cutting edge 5.

In the present embodiment, the rake surface 21 includes an end rake surface 21a, a pair of side rake surfaces 21b, and a pair of corner rake surfaces 21c. The end rake surface 21a is continuous with the end cutting edge 5a, and is inclined downward as departing from the end cutting edge 5a. The pair of side rake surfaces 21b are respectively continuous with the pair of side cutting edges 5b, and are respectively inclined downward as departing from the pair of side cutting edges 5b. The pair of corner rake surfaces 21c are respectively located on opposite sides of the end rake surface 21a. The pair of corner rake surfaces 21c are respectively continuous with the pair of corner cutting edges 5c, and are respectively inclined downward as departing from the pair of corner cutting edges 5c.

The corner rake surfaces 21c are respectively inclined downward as departing from the corner cutting edges 5c over the entire region of the corner cutting edges 5c. A bisector M in FIG. 2 passes through the corner cutting edges 5c and the corner rake surfaces 21c. Here, the term "being inclined downward or upward" is to be determined on the basis of a state in which the insert 1 is mounted on a horizontal plane.

When it is difficult to mount the insert 1 alone on the horizontal plane, a determination may be made on the basis of a state in which a cutting tool with the insert 1 attached to the holder is mounted on the horizontal plane. In FIGS. 3B, 5A, and FIGS. 7C to 7E of the present application, a plane parallel to the horizontal plane used for mounting is denoted by a reference character "L".

Figure 5A:
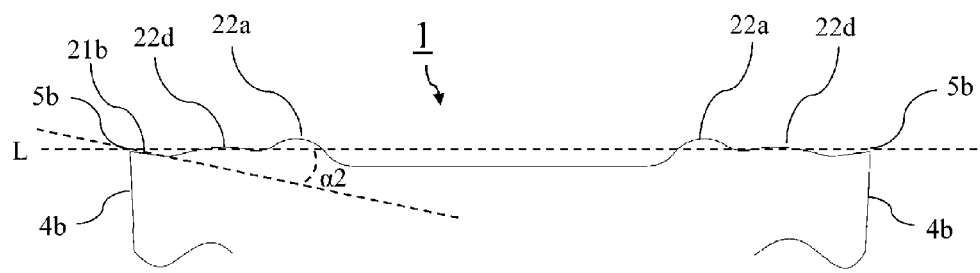
FIG. 5A is a cross-sectional view of the cutting insert shown in FIG. 4 taken along line A1-A1.
Figure 7A:
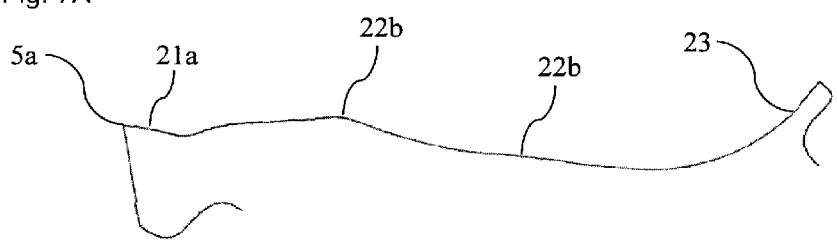
FIG. 7A is a cross-sectional view of the cutting insert shown in FIG. 6 taken along line A2-A2.
Figure 7B:
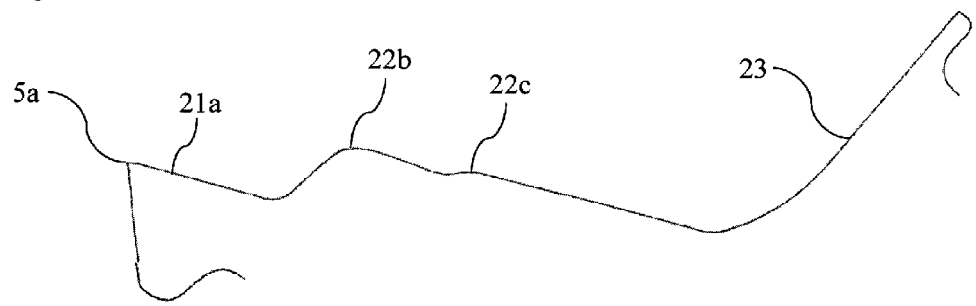
FIG. 7B is a cross-sectional view of the cutting insert shown in FIG. 6 taken along line B2-B2.
Figure 7C:
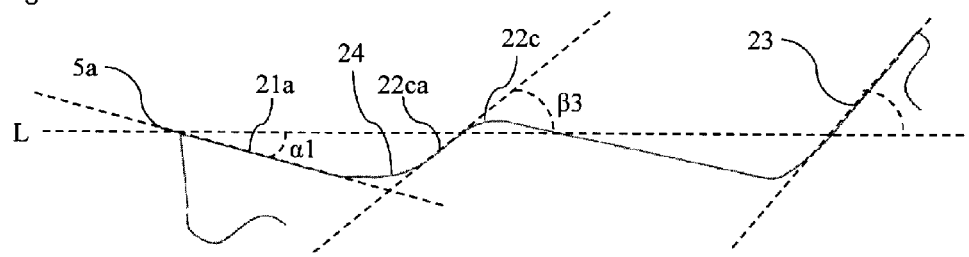
FIG. 7C is a cross-sectional view of the cutting insert shown in FIG. 6 taken along line C2-C2.
Figure 7D:
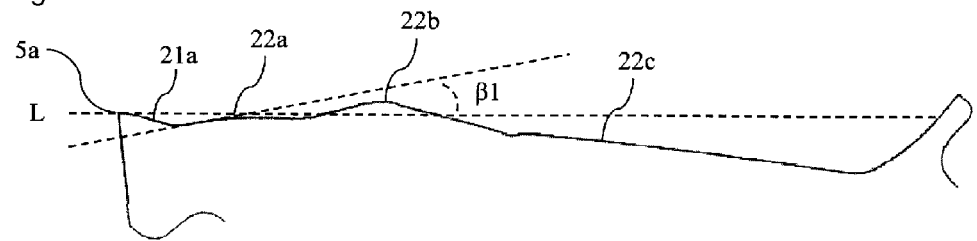
FIG. 7D is a cross-sectional view of the cutting insert shown in FIG. 6 taken along line A3-A3.
Figure 7E:
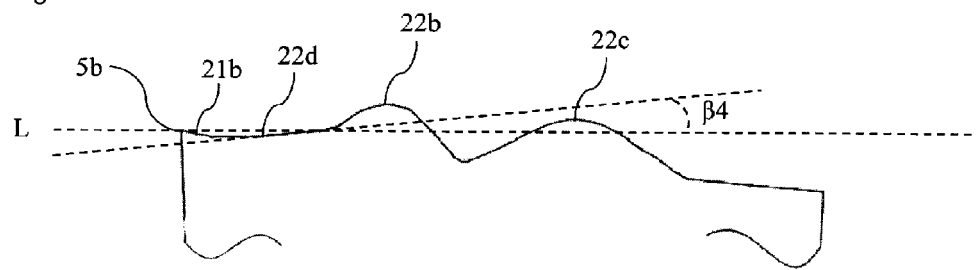
FIG. 7E is a cross-sectional view of the cutting insert shown in FIG. 6 taken along line B3-B3.

In the present embodiment, a rake angle $\alpha 1$ of the end rake surface 21a is larger than a rake angle of the corner rake surface 21c and a rake angle $\alpha 2$ of the side rake surface 21b. The rake angle $\alpha 1$ of the end rake surface 21a is shown in FIG. 7C. The rake angle $\alpha 2$ of the side rake surface 21b is shown in FIG. 5A. The rake angle of the corner rake surface 21c is larger than the rake angle $\alpha 2$. For example, the rake angle $\alpha 1$ is set to 5 to 20°, and the rake angle $\alpha 2$ is set to 0 to 15°. The rake angle of the corner rake surface 21c is set to, for example, 8 to 20°.

According to the present embodiment, setting is made in the end rake surface 21a and the corner rake surface 21c so that the rake angle at a boundary portion of the end rake surface 21a and the corner rake surface 21c reaches a maximum. Setting is also made so that the rake angle decreases as going from the boundary portion to the side rake surfaces 21b.

The rake angle $\alpha 2$ decreases as departing from the end cutting edge 5a. The pair of side rake surfaces 21b are located closer to the end cutting edge 5a than a rear protrusion 22c described later in the top view.

Figure 4:
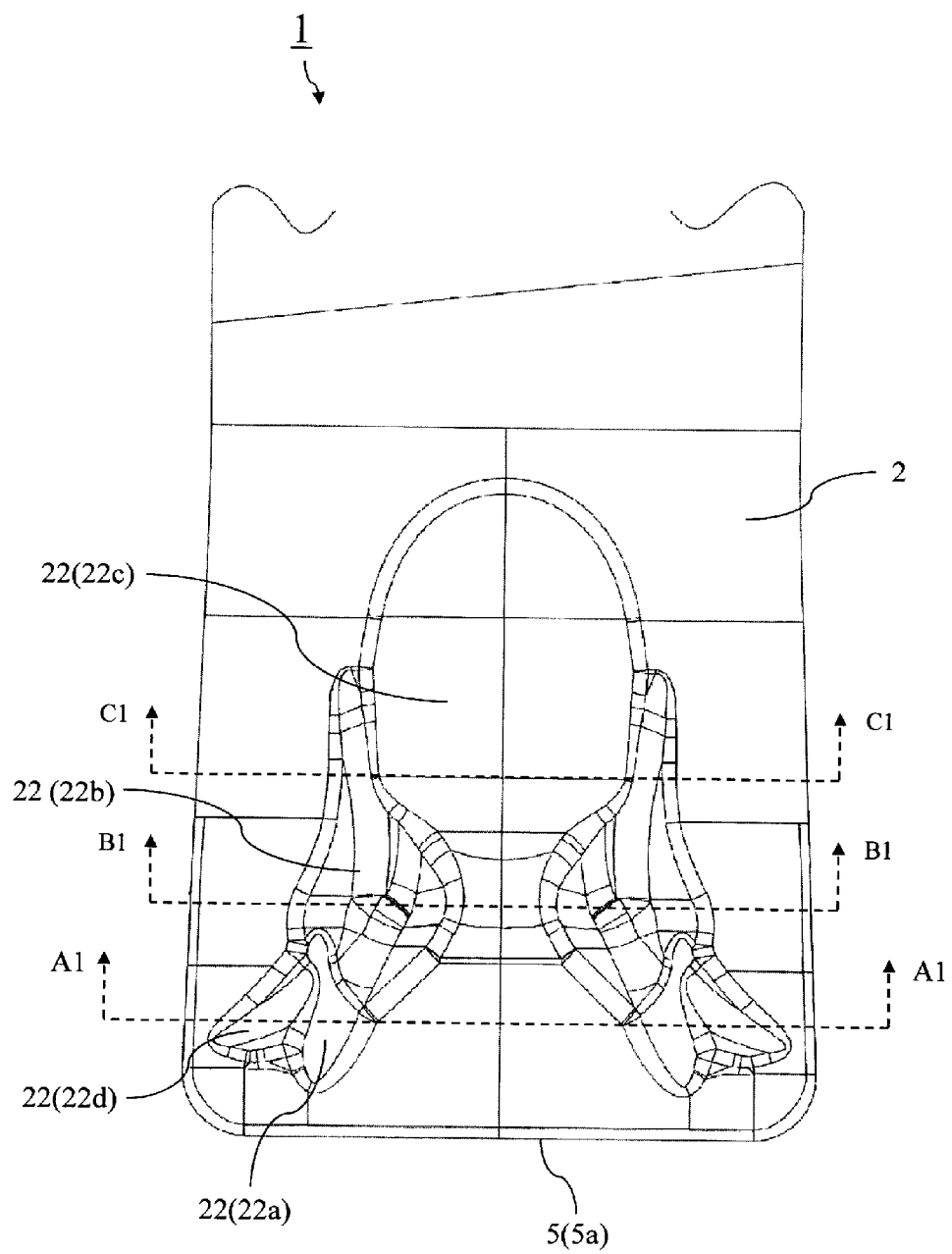
FIG. 4 is a partially enlarged top view of the cutting insert shown in FIG. 1A, which is the same as FIG. 2.
Figure 5B:
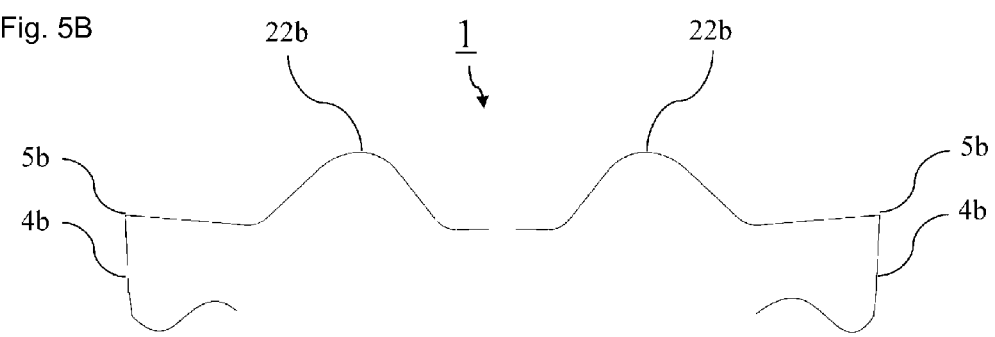
FIG. 5B is a cross-sectional view of the cutting insert shown in FIG. 4 taken along line B1-B1.
Figure 5C:
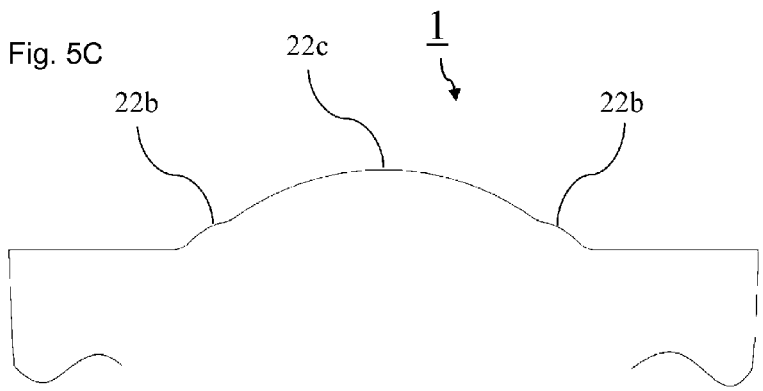
FIG. 5C is a cross-sectional view of the cutting insert shown in FIG. 4 taken along line C1-C1.

FIG. 4 is a partially enlarged top view of the cutting insert shown in FIG. 1A. FIG. 4 shows the same region as the region shown in FIG. 2. Some of reference numerals shown in FIG. 2 is omitted in FIG. 4. FIG. 5A is a cross-sectional view of the cutting insert shown in FIG. 4 taken along line A1-A1. FIG. 5B is a cross-sectional view of the cutting insert shown in FIG. 4 taken along line B1-B1. FIG. 5C is a cross-sectional view of the cutting insert shown in FIG. 4 taken along line C1-C1.

The upper surface 2 has the protrusion 22 on the rake surface 21. The protrusion 22 has a role in deforming chips, and also cooperates with the rake surface 21 to guide the chips in the discharge direction.

In the present embodiment, the protrusion 22 includes a pair of major protrusions 22a and a pair of minor protrusions 22d. The pair of major protrusions 22a are located apart from the end cutting edge 5a in the top view. The pair of minor protrusions 22d are located close to their adjacent side clearance surface 4b of the pair of side clearance surfaces 4b with respect to the pair of major protrusions 22a. In other words, the pair of minor protrusions 22d are respectively located between the pair of major protrusions 22a and the pair of side clearance surfaces 4b.

The protrusion 22 may further include a rear protrusion 22c and a pair of intermediate protrusions 22b. The rear protrusion 22c is located further apart from the end cutting edge 5a than the pair of major protrusions 22a. The rear protrusion 22c is located between the pair of major protrusions 22a when viewed from the front clearance surface 4a. The pair of intermediate protrusions 22b are located so as to connect the pair of major protrusions 22a and the rear protrusion 22c. Therefore, the pair of intermediate protrusions 22b are at least partially located between the pair of major protrusions 22a and the rear protrusion 22c. The pair of intermediate protrusions 22b are at least partially located in a region further apart from the end cutting edge 5a than the pair of major protrusions 22a in the top view.

In the present embodiment, the portions of the pair of major protrusions 22a, which are protruded from the intermediate protrusions 22b to the end cutting edge 5a, are less apart from each other as departing from the end cutting edge 5a. In other words, the distance between the pair of major protrusions 22a is decreased as departing from the end cutting edge 5a. Consequently, owing to the pair of major protrusions 22a that are less apart from each other as departing from the end cutting edge 5a, the chips generated in the end cutting edge 5a are deformed so as to be squeezed, thus ensuring a satisfactory discharge of the chips.

Figure 6:
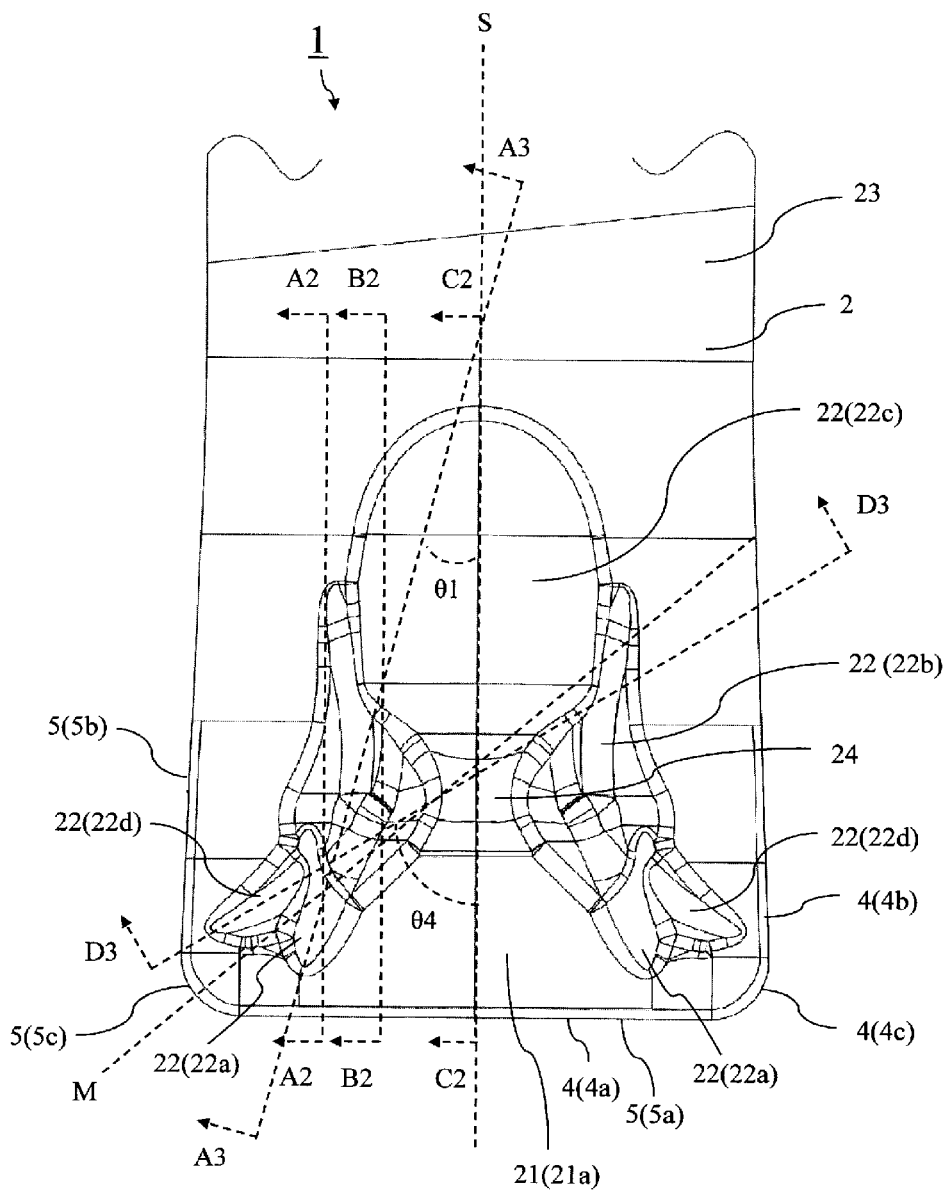
FIG. 6 is a partially enlarged top view of the cutting insert shown in FIG. 1A, which is the same as FIG. 2.

Moreover, the portions of the pair of minor protrusions 22d, which are protruded from the intermediate protrusion 22b to the end cutting edge 5a, are less apart from each other as departing from the end cutting edge 5a. In other words, the distance between the pair of minor protrusions 22d decreases as departing from the end cutting edge 5a. In addition to this, as shown in FIG. 6, an inclination angle $\theta 4$ of the pair of minor protrusions 22d is larger than an inclination angle $\theta 1$ of the pair of major protrusions 22a with respect to a reference line S that is a perpendicular line of the end cutting edge 5a and passes through a midpoint of end portions of the pair of major protrusions 22a which are close to the end cutting edge 5a, in the top view.

Here, the inclination angle with respect to the reference line S is to be measured using a straight line connecting a bottom portion (which is closest to the cutting edge 5 and is the point to start an upward inclination) and a top portion (which is the position having the maximum height from the horizontal plane L) of each of the protrusions 22. When the bottom portion and the top portion have a predetermined length in a direction parallel to the end cutting edge 5a in the top view, a measurement may be made using their respective midpoint. The measurement can be made similarly in FIG. 9 described later. Thus, the distance between the pair of protrusions decreases to allow the chips to be effectively deformed so as to be squeezed.

The pair of major protrusions 22a and the pair of minor protrusions 22d are located sequentially from the side of the end cutting edge 5a. This ensures improvement in chip discharge stability over a wide range from low-feed to high-feed cutting conditions.

The pair of major protrusions 22a, the pair of intermediate protrusions 22b, and the rear protrusion 22c are located sequentially as departing from the end cutting edge 5a. This ensures that under the high-feed condition, relatively thick chips generated by the end cutting edge 5a are deformed by the pair of major protrusions 22a and the pair of intermediate protrusions 22b so as to enhance their stiffness. The chips with enhanced stiffness are feedable rearwardly while causing them to collide with the rear protrusion 22c. Hence, the cutting insert 1 is capable of producing excellent chip discharge performance while avoiding the risk that the chips stay the protrusions 22. The chips after climbing over the rear protrusion 22c collide with the rising surface 23 so as to be curled and discharged.

Under the low-feed condition or middle-feed condition, the stiffness of relatively thin chips generated by the end cutting edge 5a is enhanced by the pair of major protrusions 22a and the pair of intermediate protrusions 22b. Additionally, the rear protrusion 22c ensures the stable discharge of the chips.

In the present embodiment, the pair of major protrusions 22a are respectively continuous with the end rake surface 21a. Therefore, the chips generated by the end cutting edge 5a are satisfactorily deformable in a discharge process of the chips generated by the end cutting edge 5a. One end of the end rake surface 21a, specifically, the end portion of the end rake surface 21a which is most apart from the end cutting edge 5a extends to a position further apart from the end cutting edge 5a than the pair of major protrusions 22a. That is, the end rake surface 21a is inclined downward until the deformation of the chips is started by the pair of major protrusions 22a. Therefore, a difference in height between the top portion of the pair of major protrusions and the end rake surface 21a can be used to more stably deform and discharge the chips.

An ascent portion 22ca of the rear protrusion 22c is located further apart from the end cutting edge 5a than the end rake surface 21a. A boundary region 24 of the end rake surface 21a and the ascent portion 22ca of the rear protrusion 22c is located between the pair of intermediate protrusions 22b in the top view. At least a part of the boundary region 24 is the plane parallel to the horizontal plane L. This ensures that the chips after passing through the end rake surface 21a being inclined downward rub against the surface parallel to the horizontal plane L so as to reduce the discharge speed thereof. Therefore, a large change in the chip discharge direction is suppressible when the chips having reduced discharge speed is brought into contact with the rear protrusion 22c.

In the present embodiment, the pair of minor protrusions 22d are located further apart from the end cutting edge 5a than the end portion of each of the pair of major protrusions 22a which is close to the end cutting edge 5a. The top portion of each of the pair of minor protrusions 22d is lower than the top portion of each of the pair of major protrusions 22a.

This ensures that when a workpiece is subjected to the grooving process or cut-off process, the chips generated by the end cutting edge 5a pass along the end rake surface 21a. At that time, the portions of the chips brought into contact with the pair of major protrusions 22a are upheaved and deformed so as to be squeezed in the width direction thereof, thus ensuring the stable discharge of the chips. The minor protrusions 22d are respectively located outside of the major protrusions 22a, and are respectively further apart from the end cutting edge and have a smaller height than the major protrusions. Hence, the minor protrusions 22d have little contribution to the process related to the deformation and discharge of the chips as described above, thereby suppressing the fracture of the minor protrusions 22d.

Meanwhile, when the workpiece is subjected to a process of increasing a groove width by using the end portion of the end cutting edge 5a or to the chamfering process, the chips generated by the region of the end portion of the end cutting edge 5a are to be deformed upon contact with the minor protrusions 22d. That is, during the processes, such as the process of increasing the groove width, and the chamfering process, the chips are also stably dischargeable during these processes without bringing the chips into contact with the major protrusions 22a.

In the present embodiment, at least a part of the bisector M of an angle formed by an extension line of the end cutting edge 5a and extension lines of the pair of side cutting edges 5b passes through between the pair of major protrusions 22a and the pair of minor protrusions 22d in the top view. With this configuration, the chips generated during the process of increasing the groove width or the chamfering process are more easily contacted with the minor protrusions 22d, thus ensuring a more stable discharge of the chips.

The pair of major protrusions 22a are inclined upward at a climbing angle $\beta1$ and the pair of minor protrusions 22d are inclined upward at a climbing angle $\beta4$ as departing from the end cutting edge 5a. The climbing angle $\beta1$ of the pair of major protrusions 22a is larger than the climbing angle $\beta4$ of the pair of minor protrusions 22d. This makes it difficult for the chips generated by the end cutting edge 5a to contact with the pair of minor protrusions 22d. Consequently, the chips are preferentially brought into contact with the major protrusions 22a, thereby more effectively suppressing the fracture of the pair of minor protrusions 22d.

For example, the climbing angle $\beta1$ of the pair of major protrusions 22a is set to 10 to 15°, and the climbing angle $\beta4$ of the pair of minor protrusions 22d is set to 5 to 10°. The climbing angle $\beta4$ of the pair of minor protrusions 22d is not limited to the above-mentioned numerical range. The climbing angle $\beta4$ is settable to a value necessary for satisfactorily discharging the chips by changing a flow direction of the chips generated, for example, during the process for increasing the groove width or the chamfering process.

Second Embodiment

A cutting insert according to a second embodiment of the present invention is described in detail below with reference to FIG. 3.

Figure 3A:
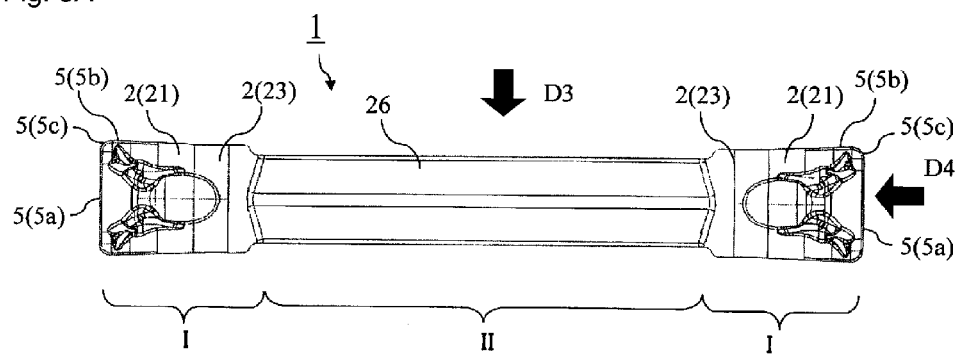
FIG. 3A is a top view of a cutting insert according to a second embodiment of the present invention.
Figure 3B:
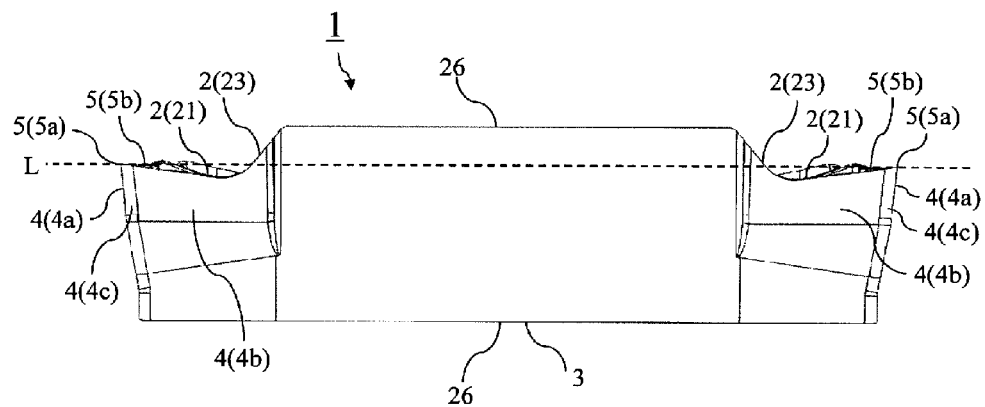
FIG. 3B is a side view of the cutting insert shown in FIG. 3A taken in the width direction thereof.
Figure 3C:
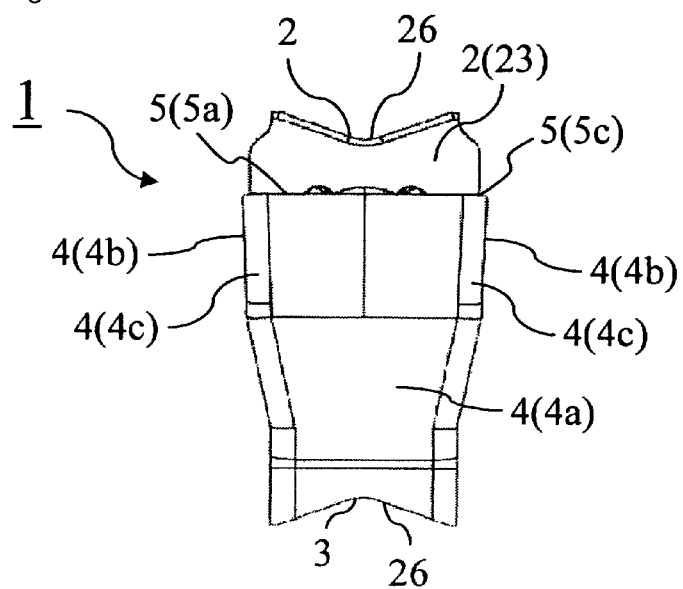
FIG. 3C is a side view (front view) of the cutting insert shown in FIG. 3A taken in the longitudinal direction thereof.

In FIGS. 3A to 3C, the same components as in the foregoing FIGS. 1A to 1C and FIG. 2 are provided with identical reference numerals, and the descriptions thereof are generally omitted. The basic configuration of the cutting insert 1 of the present embodiment is the same as that of the cutting insert 1 of the first embodiment. Therefore, the following description is focused on differences from the cutting insert 1 of the first embodiment, and the descriptions of overlapping contents are omitted.

FIG. 3A is a top view of the cutting insert 1 according to the second embodiment of the present invention. FIG. 3B is a side view of the cutting insert 1 shown in FIG. 3A taken in the width direction thereof. Specifically, FIG. 3B is the side view of the cutting insert 1 shown in FIG. 3A taken in the direction of arrow D3. FIG. 3C is a front view of the cutting insert 1 shown in FIG. 3A (a side view in the longitudinal direction thereof). Specifically, FIG. 3C is the front view of the cutting insert 1 shown in FIG. 3A taken in the direction of arrow D4.

The cutting insert 1 of the present embodiment has an approximately prismatic shape. Two cutting sections I are respectively located at opposite end portions (left and right end portions in FIG. 3A) of the cutting insert 1. An attachment section II is located between the two cutting sections I. The attachment section II includes a clamp surface as an attachment surface 26 to be brought into contact with the holder when fixed by a clamp member of the holder. The insert 1 of the present embodiment is usable in a grooving process, a cut-off process, a traversing process, and a chamfering process. The grooving process includes both an internal grooving process and an external grooving process.

FIG. 2 is the enlarged view of the cutting sections I of the cutting insert 1 according to the first embodiment as described above, and is also the enlarged view of the cutting sections I of the cutting insert 1 according to the present embodiment.

In the present embodiment, each of the cutting sections II includes an upper surface 2, a lower surface 3, and a side surface 4 connected to the upper surface 2 and the lower surface 3. The upper surface 2 functions as a rake surface 21 and the clamp surface configured to be mounted on the holder. The lower surface 3 functions as the clamp surface configured to be mounted on the holder. The side surface 4 functions as a flank surface.

Although the size of the insert 1 is not particularly limited, in the present embodiment, a widthwise length of the insert 1 indicated by a vertical length in FIG. 3A is 2 to 8 mm, and a longitudinal length of the insert 1 indicated by a crosswise length in FIG. 3A is approximately 20 to 30 mm. The height of the insert 1 from the lower surface 3 to the upper surface 2, which is indicated by the vertical length in FIG. 3B, is set to 4 to 10 mm depending on the crosswise length of the insert 1.

Other configurations are similar to those of the cutting insert 1 according to the foregoing first embodiment, and hence the descriptions thereof are omitted.

The insert 1 of the present embodiment is also capable of producing an operation advantage similar to that of the insert 1 of the first embodiment.

(Modification)

A modification of the cutting insert according to the foregoing first or second embodiment is described below with reference to FIGS. 8 to 12.

Figure 9:
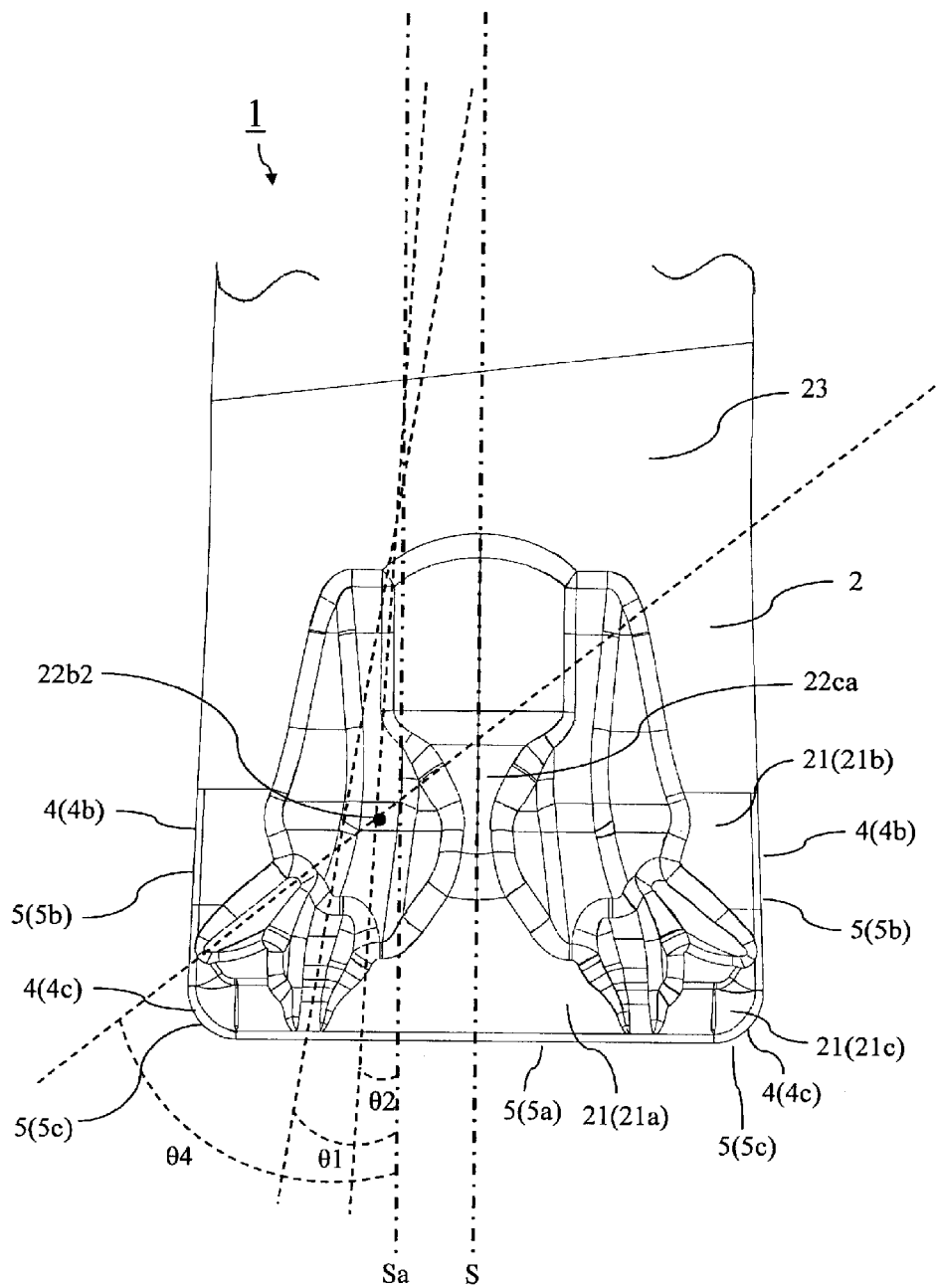
FIG. 9 is a top view of the insert shown in FIG. 8A.
Figure 10:
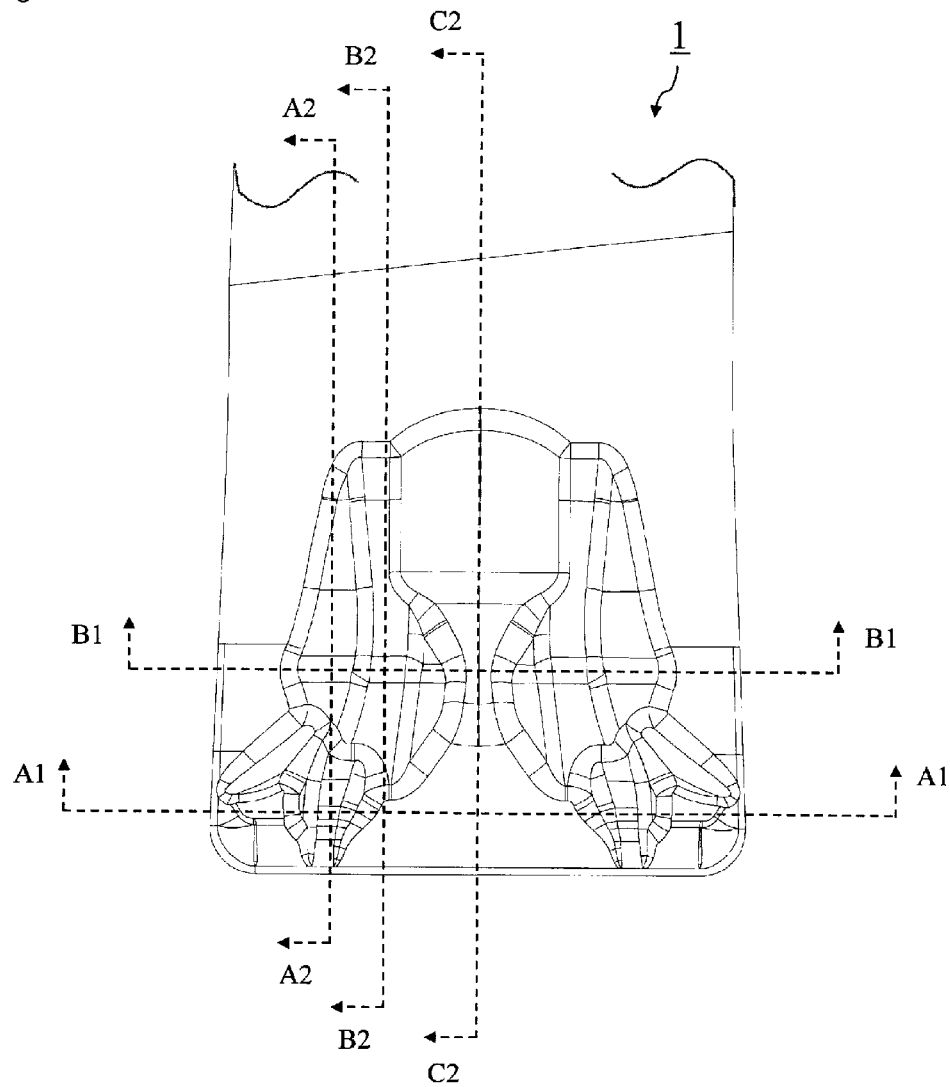
FIG. 10 is a top view of the insert shown in FIG. 8A.
Figure 11A:
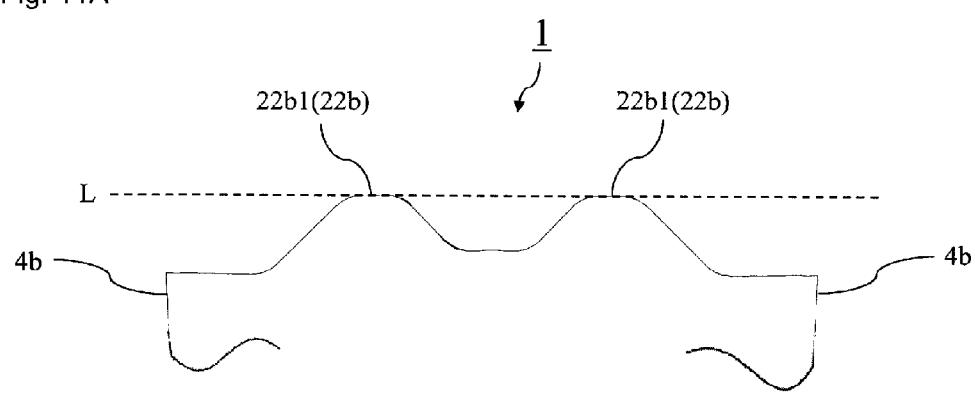
FIG. 11A is a cross-sectional view of the cutting insert shown in FIG. 8A taken along line B1-B1.
Figure 11B:
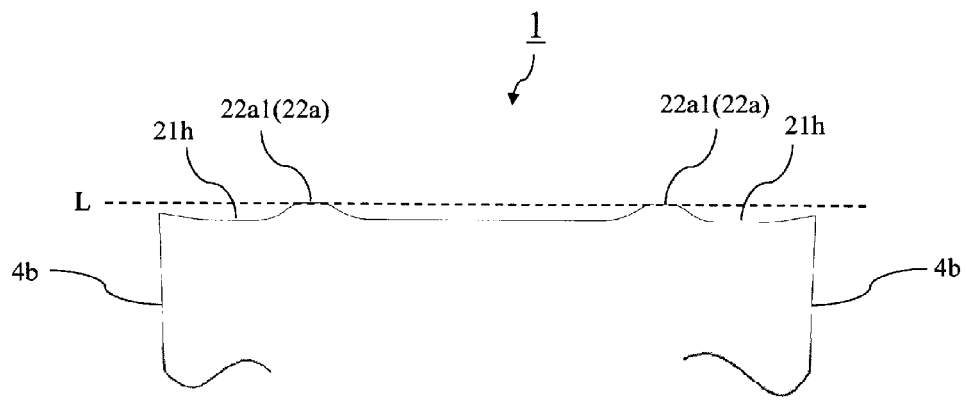
FIG. 11B is a cross-sectional view of the cutting insert shown in FIG. 8A taken along line A1-A1.

In the foregoing first and second embodiments, the inclination angle of the pair of intermediate protrusions 22b is larger than the inclination angle θ1 of the pair of major protrusions 22a with respect to the reference line S in the top view. In the present modification, as shown in FIG. 9, an inclination angle θ2 of the pair of intermediate protrusions 22b is smaller than an inclination angle θ1 of the pair of major protrusions 22a with respect to a straight line Sa parallel to the reference line S in the top view.

Consequently, the chips are to be deformed so that their width is effectively reduced by the pair of major protrusions 22a having the large inclination angle θ1 with respect to the reference line S as departing from the end cutting edge 5a. The chips having reduced width collide with the pair of intermediate protrusions 22b so as to be turned upward and curled. This makes it possible to produce stable discharge performance with respect to the chips having a relatively large width.

In the foregoing first and second embodiments, the rake angles of the rake surface 21 are, in the order of their decreasing angle, the rake angle of the end rake surface 21a, the rake angle of the corner rake surface 21c, and the rake angle of the side rake surface 21b. In the present modification, the rake angle of the corner rake angle 21c is larger than the rake angle of the end rake surface 21a.

In the present modification, setting is made so that the rake angle of the end rake surface 21a in opposite ends of the end cutting edge 5a is smaller than that in a region extending along a middle part of the end cutting edge 5a. Accordingly, the portion of the chip generated in the middle part of the end cutting edge 5a and the portion of the chip generated at the opposite ends differ in discharge direction. This ensures facilitation of the deformation upon contact with the pair of major protrusions 22a or the like.

Figure 8A:
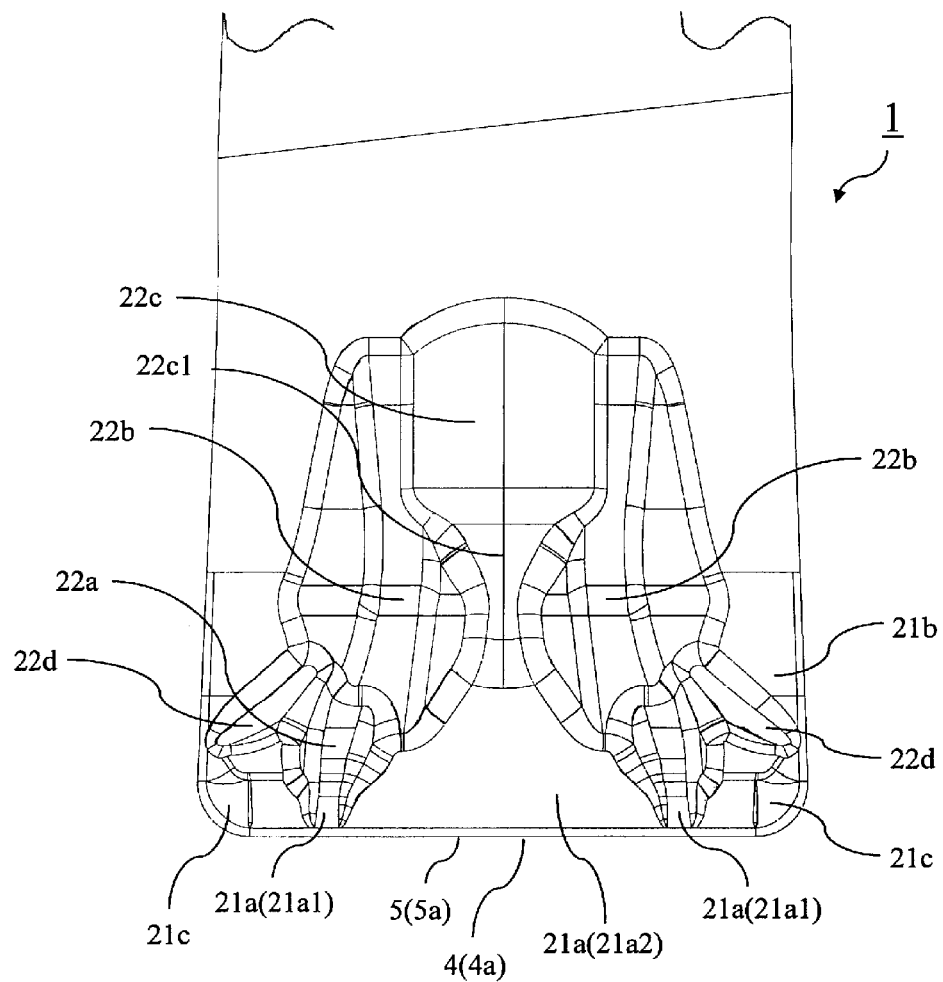
FIG. 8A is a top view of a modification of the cutting insert shown in FIG. 1A.
Figure 8B:
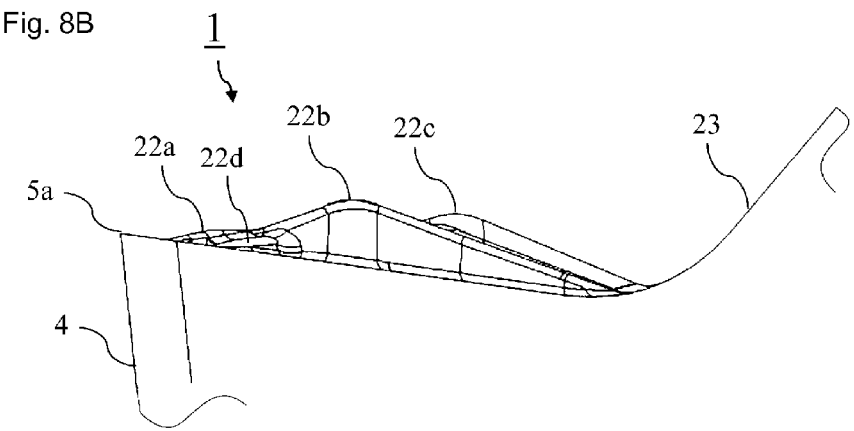
FIG. 8B is a side view of the cutting insert shown in FIG. 8A.

For example, as shown in FIG. 8A, setting is made so that an end rake angle in a region between the end cutting edge 5a and the pair of major protrusions 22a (hereinafter referred to as a first region 21a1 for the sake of convenience) is smaller than an end rake angle in a region surrounded by the end cutting edge 5a and the pair of major protrusions 22a (hereinafter referred to as a second region 21a2 for the sake of convenience). Accordingly, the chips preferentially flow toward the pair of major protrusions 22a through a portion of the end rake surface 21a whose inclination is relatively gentle, thereby stabilizing the discharge direction.

For example, the rake angle in the second region 21a2 is set to 0 to 15°, and the rake angle in the first region 21a1 is set to 5 to 20°. The present modification is not provided with a horizontal plane, such as the boundary region 24 in the foregoing embodiments, and hence the end rake surface 21a and an ascent portion 22ca of the rear protrusion 22c are substantially continuous with each other.

Figure 12A:
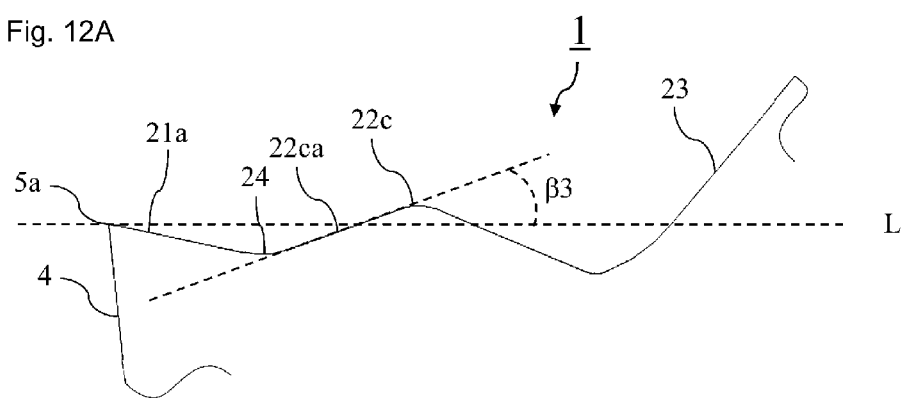
FIG. 12A is a cross-sectional view of the cutting insert shown in FIG. 8A taken along line C2-C2.
Figure 12B:
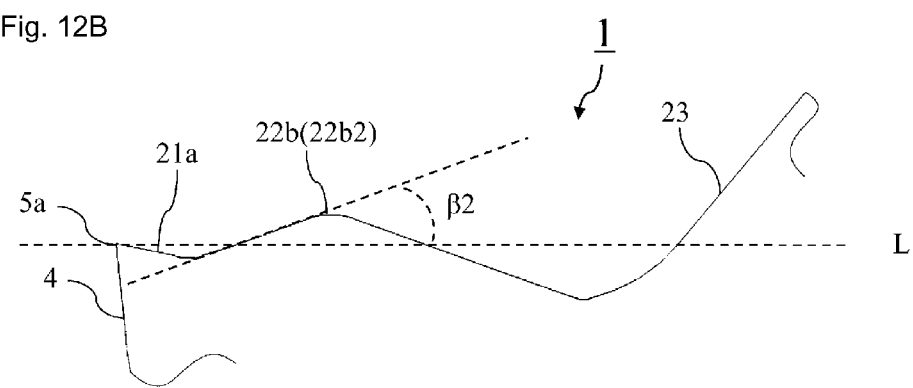
FIG. 12B is a cross-sectional view of the cutting insert shown in FIG. 8A taken along line B2-B2.
Figure 12C:
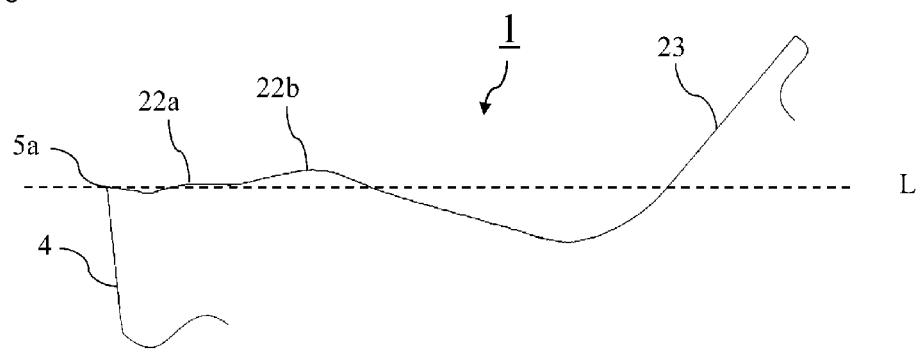
FIG. 12C is a cross-sectional view of the cutting insert shown in FIG. 8A taken along line A2-A2.

In the present modification, the pair of intermediate protrusions 22b are inclined upward as departing from the end cutting edge 5a. A climbing angle β3 of the ascent portion 22ca of the rear protrusion 22c is smaller than a climbing angle β2 of the pair of intermediate protrusions 22b. The climbing angle β3 of the ascent portion 22ca is shown in FIG. 12A. The climbing angle β2 of the pair of intermediate protrusions 22b is shown in FIG. 12B. Consequently, the chips preferentially collide with the pair of intermediate protrusions 22b, thus ensuring that the chips are turned upward in a well-balanced manner.

The ascent portion 22ca of the rear protrusion 22c is located further apart from the end cutting edge 5a than the top portions 22b2 of the intermediate protrusions 22b. Owing to a synergistic effect of this feature and the foregoing feature that the climbing angle β3 is smaller than the climbing angle β2, it is possible to effectively avoid the risk that the chips stay in a region extending between the pair of intermediate protrusions 22b and the rear protrusion 22c.

Other configurations are similar to those of the cutting insert 1 according to the foregoing first embodiment, and hence the descriptions thereof are omitted.

Cutting Tool

First Embodiment

A cutting tool 10 according to a first embodiment of the present invention is described below with reference to FIGS.

13 to 15. The cutting tool 10 of the present embodiment is configured to attach thereto the insert 1 according to the foregoing first embodiment as a cutting insert.

Figure 13A:
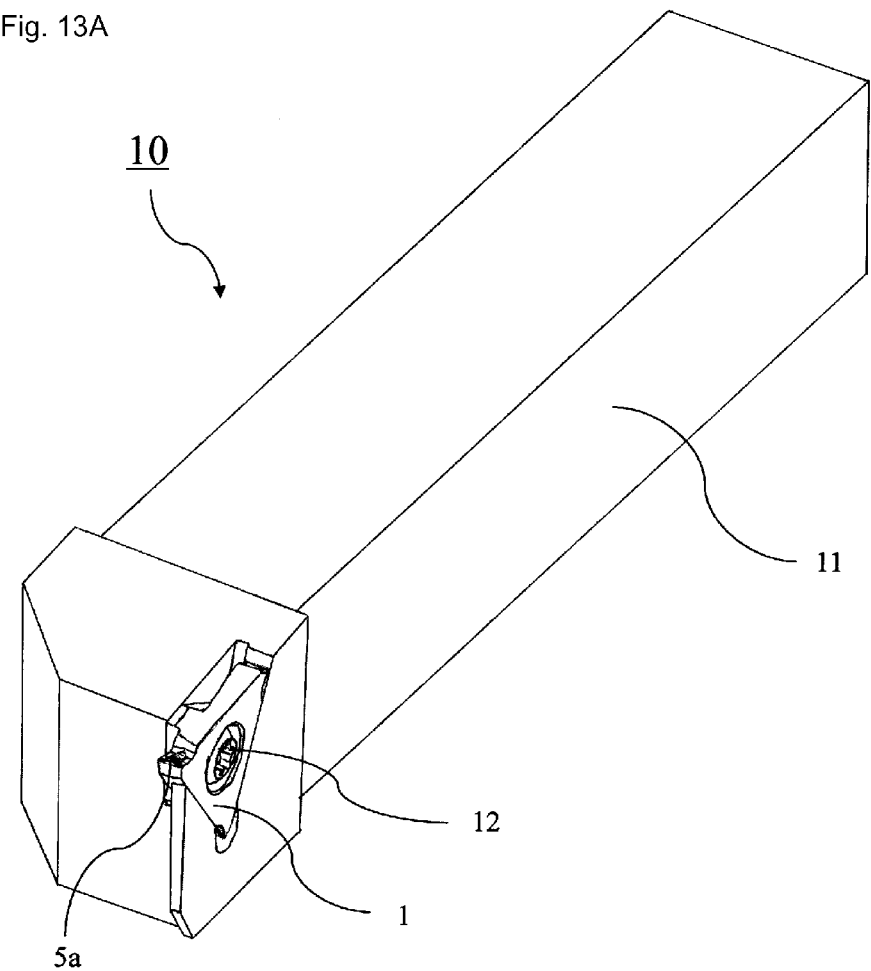
FIG. 13A is a perspective view of a cutting tool according to a first embodiment of the present invention.
Figure 13B:
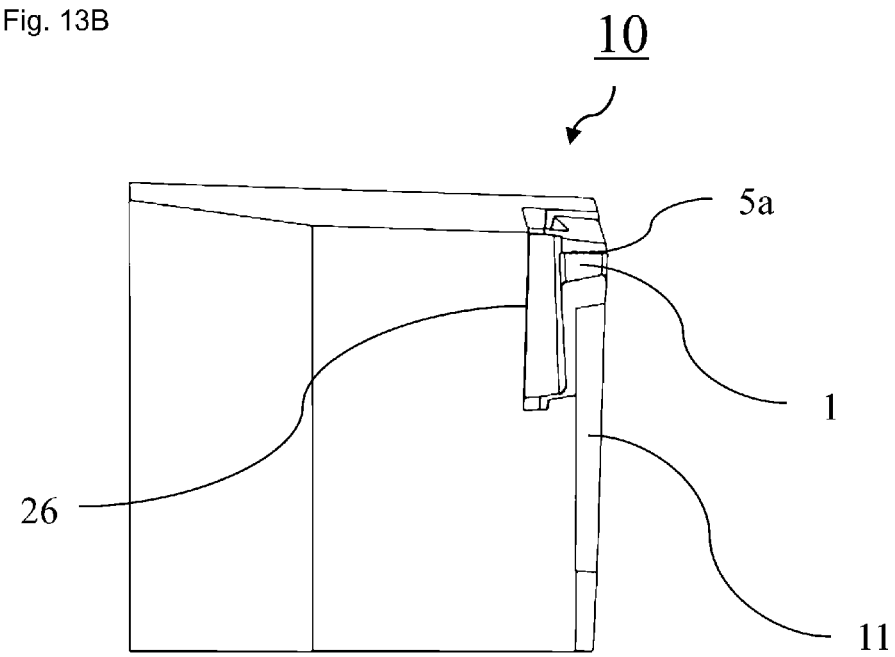
FIG. 13B is a front view of the cutting tool shown in FIG. 13A.
Figure 14A:
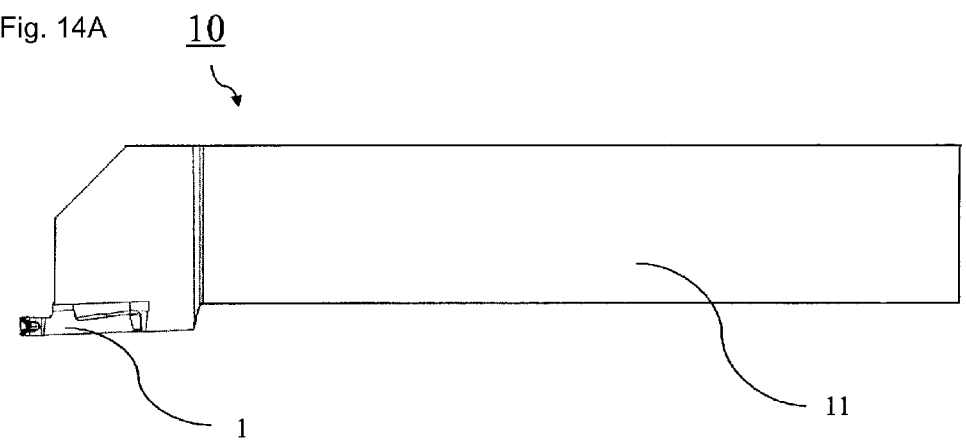
FIG. 14A is a top view of the cutting tool shown in FIG. 13A.
Figure 14B:
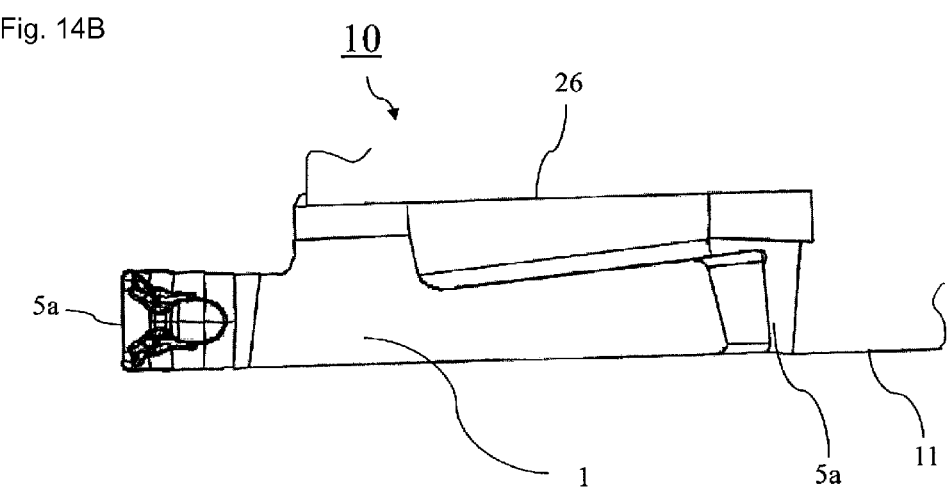
FIG. 14B is a partially enlarged top view of FIG. 14A.
Figure 15A:
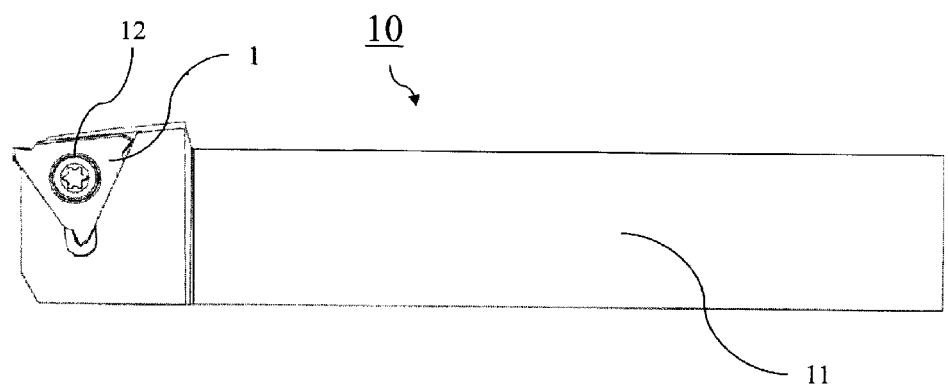
FIG. 15A is a side view of the cutting tool shown in FIG. 13A.
Figure 15B:
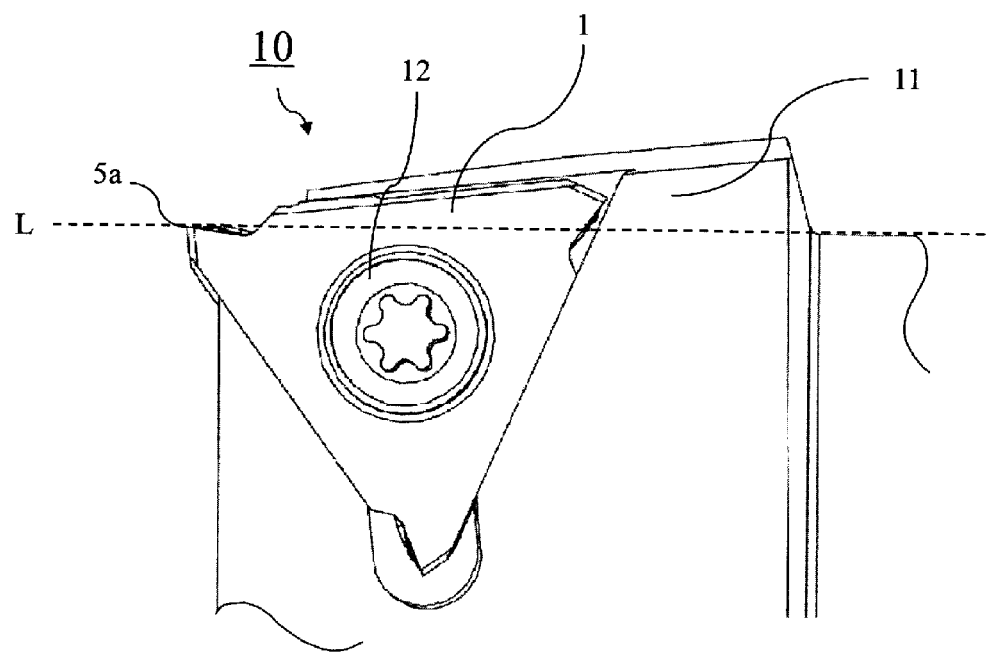
FIG. 15B is a partially enlarged side view of FIG. 15A.

FIG. 13A is a perspective view of the cutting tool 10 according to the first embodiment of the present invention. FIG. 13B is a front view of the cutting tool shown in FIG. 13A. FIG. 14A is a top view of the cutting tool shown in FIG. 13A. FIG. 14B is a partially enlarged top view of FIG. 14A. FIG. 15A is a side view of the cutting tool 10 shown in FIG. 13A. FIG. 15B is a partially enlarged side view of FIG. 15A.

The cutting tool 10 of the present embodiment includes the insert 1 and an approximately prismatic-shaped holder 11 configured to hold the insert 1 at the front end thereof. The insert 1 is to be attached to the holder 11 so as to be held in a state in which the single end cutting edge 5a is protruded from the front end of the holder 11.

In the present embodiment, a fixing member (screw) 12 is inserted from the through hole 6 of the insert 1 to the corresponding portion of the holder 11 in the front end of the holder 11. The present embodiment employs a method in which the constraint force exerted on the insert 1 by the fixing member (screw) 12 is adjusted and the insert 1 is held down from the opposite side of the attachment surface 26 so as to be constrained by the holder 11. When being constrained, the mounting surface 26 of the insert 1 is contacted with the mounting surface of the holder 11.

Second Embodiment

A cutting tool 10 according to a first embodiment of the present invention is described below with reference to FIGS. 16 to 18 by illustrating the cutting tool configured to attach thereto the insert 1 according to the foregoing second embodiment.

In FIGS. 16 to 18, the same components as in the foregoing FIGS. 13 to 15 are provided with identical reference numerals, and the descriptions thereof are generally omitted. A part of the configuration of the cutting tool 10 of the present embodiment, such as the attachment state of the cutting insert 1, is identical to that of the cutting tool 10 of the first embodiment. Therefore, the following description is focused on differences from the cutting tool 10 of the first embodiment, and the descriptions of overlapping contents are omitted.

Figure 16A:
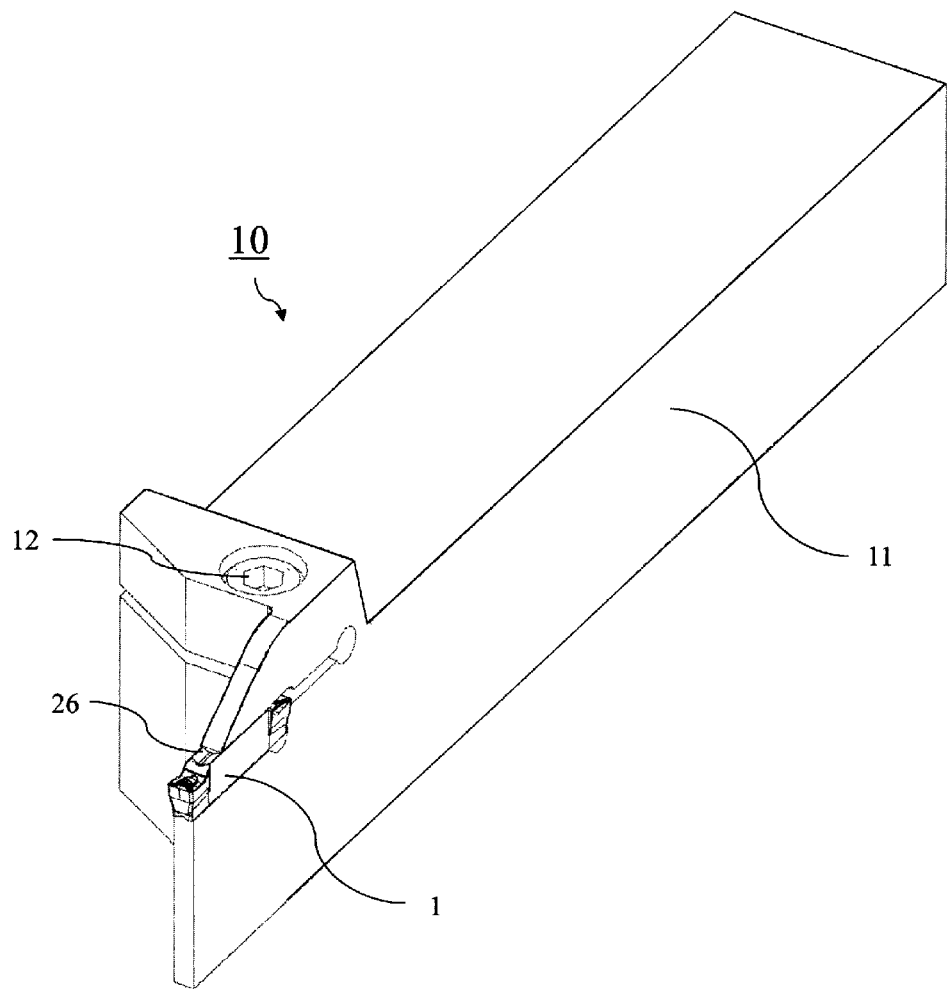
FIG. 16A is a perspective view of a cutting tool according to a second embodiment of the present invention.
Figure 16B:
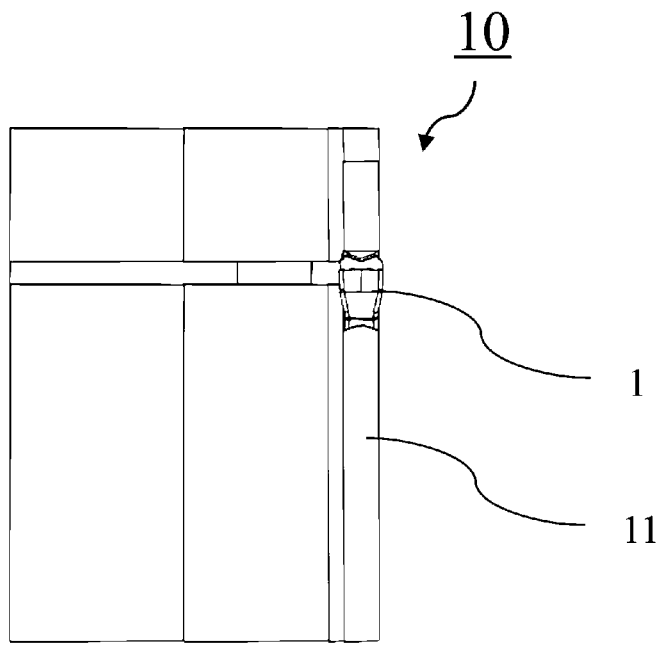
FIG. 16B is a front view of the cutting tool shown in FIG. 16A.
Figure 17A:
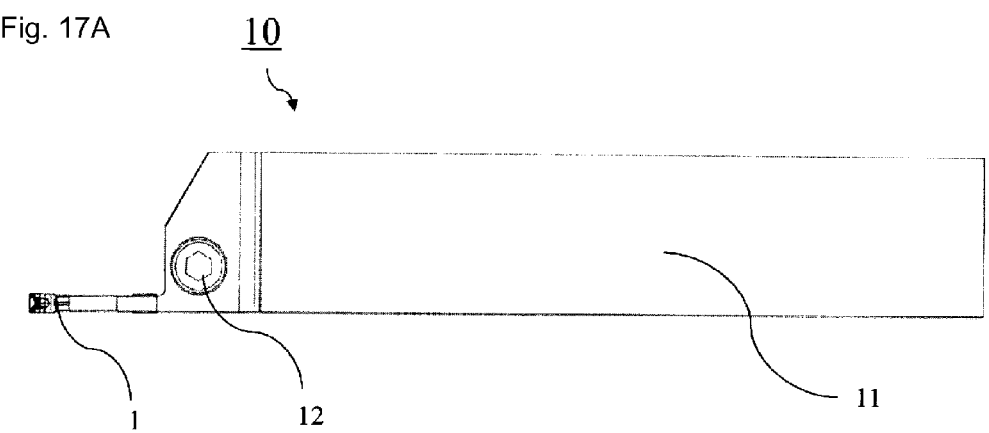
FIG. 17A is a top view of the cutting tool shown in FIG. 16A.
Figure 17B:
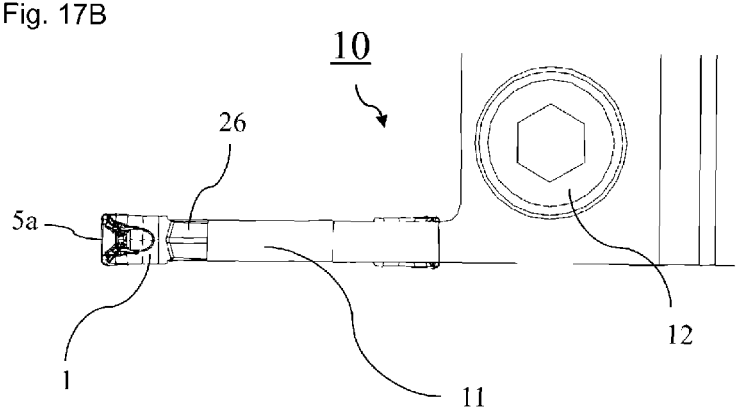
FIG. 17B is a partially enlarged top view of the cutting tool shown in FIG. 17A.
Figure 18A:
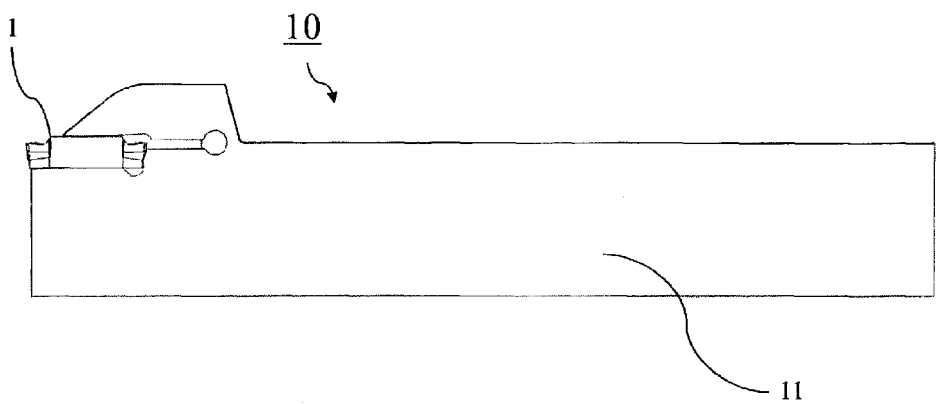
FIG. 18A is a side view of the cutting tool shown in FIG. 16A.
Figure 18B:
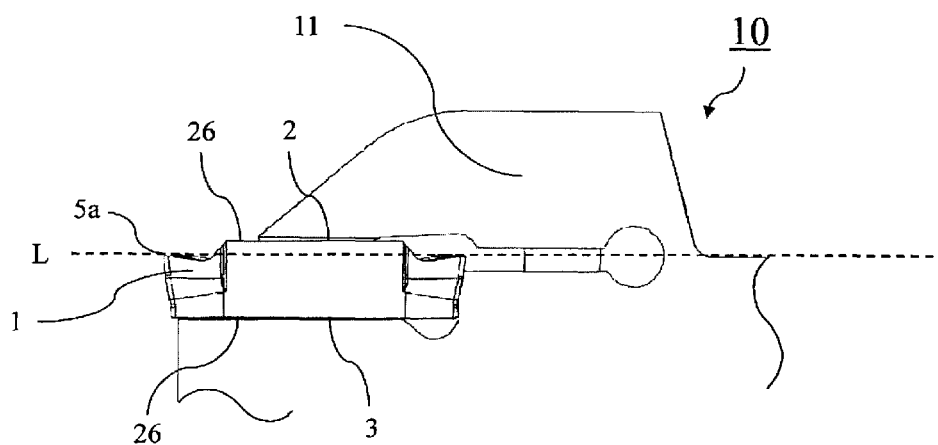
FIG. 18B is a partially enlarged side view of the cutting tool shown in FIG. 18A.

FIG. 16A is a perspective view of the cutting tool 10 according to the second embodiment of the present invention. FIG. 16B is a front view of the cutting tool 10 shown in FIG. 16A. FIG. 17A is a top view of the cutting tool 10 shown in FIG. 16A. FIG. 17B is a partially enlarged top view of FIG. 17A. FIG. 18A is a side view of the cutting tool 10 shown in FIG. 16A. FIG. 18B is a partially enlarged side view of FIG. 18A.

The cutting tool 10 of the present embodiment includes the insert 1 and an approximately prismatic-shaped holder 11 configured to screw the insert 1 into the front end thereof.

The present embodiment employs a "clamp-on method" in which the constraint force by a fixing member (screw) 12 is adjusted in the front end of the holder 11 and the insert 1 is held from above and below by an upper jaw and a lower jaw in a front end part of the holder 11 so as to be constrained by the holder 11. When being constrained, the mounting surfaces 26 (clamp surfaces) of the upper surface 2 and the lower surface 3 of the insert 1 are respectively contacted with the upper jaw and the lower jaw of the holder 11.

Other configurations are similar to those of the cutting tool 10 according to the first embodiment, and hence the descriptions thereof are omitted.

The cutting tool 10 of the present embodiment is also capable of producing an operation advantage similar to that of the cutting tool 10 of the first embodiment.

The methods employed in the foregoing embodiments may be replaced with another method. Specifically, as another method of constraining the insert 1 by the holder, there are, for example, "lever lock method" and "cam lock method". With the lever lock method, a hole is bored in the insert, and the holder includes an approximately L-shaped lever. The insert can be constrained by the holder from an inner wall of the hole of the insert by the lever using leverage. With the cam lock method, a hole is bored in the insert, and a pin whose shank part and head part are eccentric to each other is used. The pin is to be inserted into the hole of the insert so as to constrain the insert by the holder.

Method of Producing Machined Product

First Embodiment

A method of producing a machined product according to a first embodiment of the present invention is described below with reference to FIGS. 19A to 19C by illustrating the case where the cutting tool 10 having the insert 1 of the second embodiment attached thereto is applied to "the cut-off process."

The method of producing the machined product according to the present embodiment includes the following steps (i) to (iv).

Figure 19A:
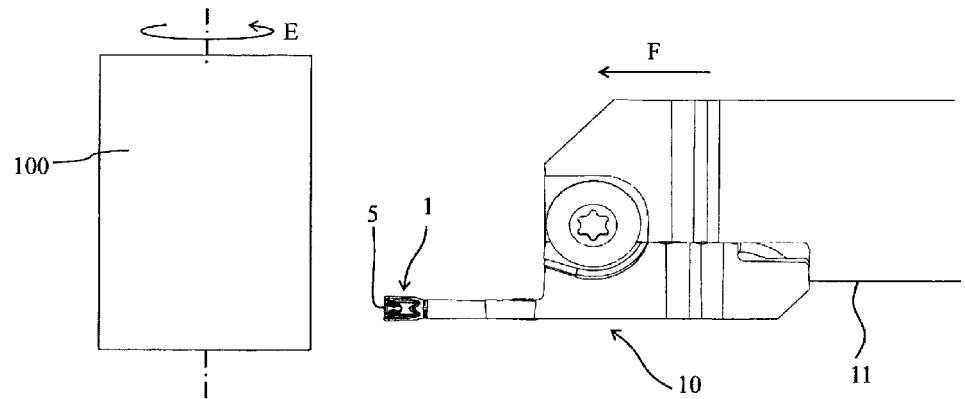
FIG. 19A is a schematic view showing a method of producing a machined product according to a first embodiment of the present invention.

The step (i) is to rotate a workpiece 100 in an arrowed direction E as shown in FIG. 19A.

The step (ii) is to rotate the cutting tool 10 in an arrowed direction F as shown in FIG. 19A so as to bring the cutting tool 10 into a close contact with the workpiece 100 being rotated.

In this step, the workpiece 100 and the cutting tool 10 need to approach each other. For example, the workpiece 100 may be brought near the cutting tool 10.

Figure 19B:
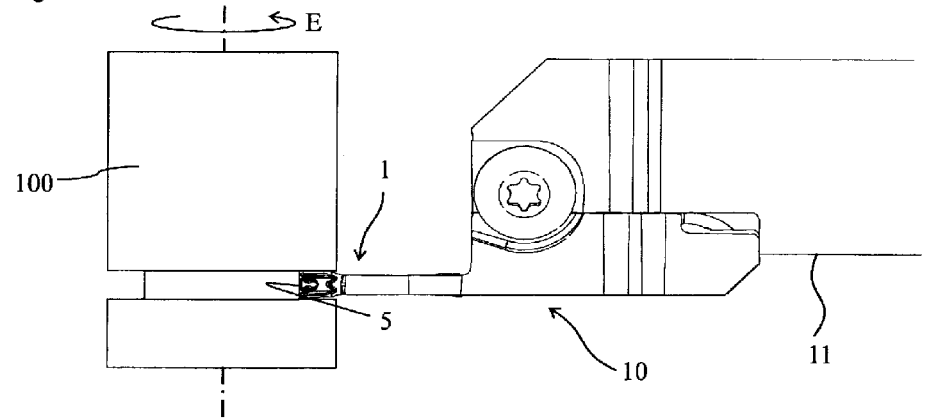
FIG. 19B is a schematic view showing the method of producing a machined product according to the first embodiment of the present invention.

The step (iii) is to bring the cutting edge 5 of the cutting tool 10 into contact with the workpiece 100 being rotated so as to cut the workpiece 100 as shown in FIG. 19B.

In this step, in a grooving process, the cutting tool 10 is moved in the arrowed direction F until the workpiece 100 is divided, so as to perform the grooving process, thus achieving a cut-off process. In FIG. 19B, the workpiece 100 is to be cut using the end cutting edge as the cutting edge 5, but not limited thereto. In order to cut the workpiece 100, any one of the end cutting edge, the pair of side cutting edges, and the corner cutting edge described earlier may be brought into contact with the workpiece 100 being rotated.

Figure 19C:
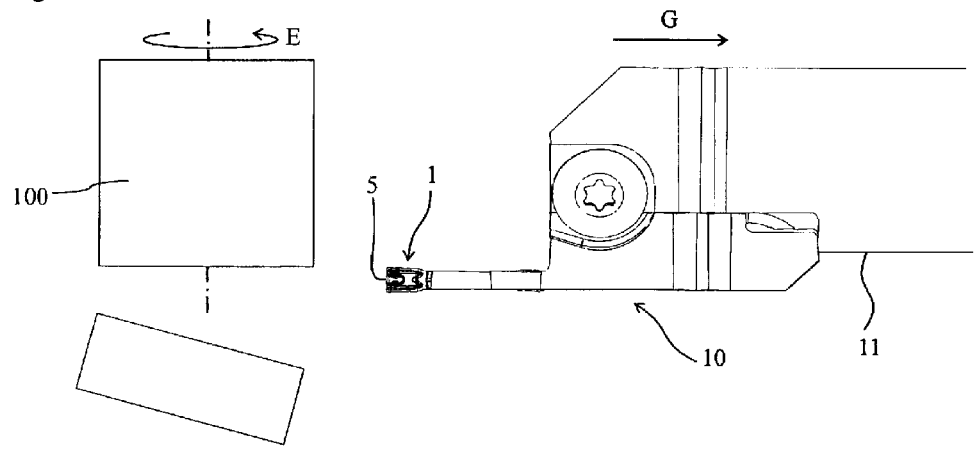
FIG. 19C is a schematic view showing the method of producing a machined product according to the first embodiment of the present invention.

The step (iv) is to move the cutting tool 10 in an arrowed direction G so as to separate the cutting tool 10 from the workpiece 100 being divided, as shown in FIG. 19C.

In this step, the workpiece 100 and the cutting tool 10 need to separate from each other. For example, the workpiece 100 may be separated from the cutting tool 10.

The machined product is obtainable by performing the foregoing steps (i) to (iv).

According to the present embodiment, as described earlier, the pair of minor protrusions are located further apart from the end cutting edge than the end portion of each of the pair of major protrusions which is close to the end cutting edge, and the top portion of each of the pair of minor protrusions is lower than the top portion of each of the pair of major protrusions. This ensures that the chips generated by the end cutting edge in the cut-off process are discharged after being deformed so that the portions of the chips brought into contact with the pair of major protrusions are upheaved. Consequently, the pair of minor protrusions have little contribution to the processing of the chips, thereby suppressing the fracture of the pair of minor protrusions.

From the above, even when performing the traversing process or chamfering process after the foregoing cut-off process, the chips generated in the region of the end portions of the end cutting edge are stably dischargeable because they are deformed upon contact with the minor protrusions without contact with the major protrusions.

When the cutting process is further continued, it is required to repeat the step of bringing the cutting edge 5 of the cutting tool 10 into contact with different portions of the workpiece 100 while holding the rotation of the cutting tool 100. The insert 1 used in the present embodiment is configured to be usable at two corners. Therefore, when the cutting edge 5 being used is worn, an unused cutting edge 5 may be used.

When the workpiece 100 is subjected to a mere grooving instead of the foregoing cut-off process, the cutting process may be performed by bringing the cutting tool 10 into contact with the region until which the workpiece 100 remains undivided.

Second Embodiment

A method of producing a machined product according to a second embodiment of the present invention is described below with reference to FIGS. 20A to 20D by illustrating the case where the cutting tool 10 having the insert 1 of the second embodiment attached thereto is applied to "the chamfering process."

In FIGS. 20A to 20D, the same components as in the foregoing FIGS. 19A to 19C are provided with identical reference numerals, and the descriptions thereof are generally omitted. The method of producing the machined product of the present embodiment is partially identical to the method of producing the machined product of the first embodiment. Therefore, the following description is focused on differences from the method of producing the machined product of the first embodiment, and the descriptions of overlapping contents are omitted.

The method of producing the machined product according to the present embodiment includes the following steps (i) to (vii).

Figure 20A:
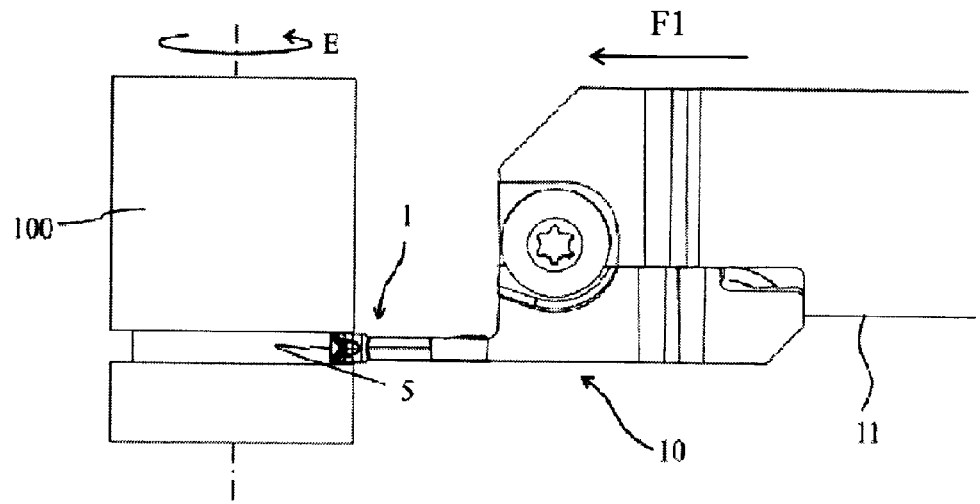
FIG. 20A is a schematic view showing a method of producing a machined product according to a second embodiment of the present invention.

The step (i) is to rotate a workpiece 100 in an arrowed direction E as shown in FIG. 20A.

The step (ii) is to move the cutting tool 10 in an arrowed direction F1 so as to bring the cutting tool 10 into a close contact with the workpiece 100 being rotated.

In this step, the workpiece 100 and the cutting tool 10 need to approach each other. For example, the workpiece 100 may be brought near the cutting tool 10.

The step (iii) is to further move the cutting tool 10 in the arrowed direction F1 and bring the cutting edge 5 of the cutting tool 10 into contact with the workpiece 100 being rotated so as to cut the workpiece 100 as shown in FIG. 20A.

In this step, a cutting process of forming a groove is performed in a grooving process.

Figure 20B:
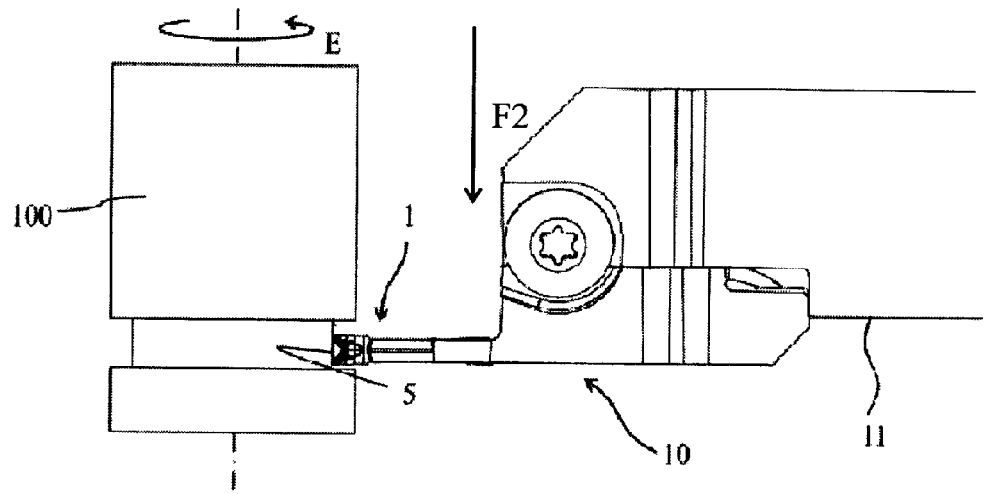
FIG. 20B is a schematic view showing the method of producing a machined product according to the second embodiment of the present invention.

The step (iv) is to move the cutting tool 10 in an arrowed direction F2 and bring the cutting edge 5 of the cutting tool 10 into contact with the workpiece 100 being rotated so as to cut the workpiece 100 as shown in FIG. 20B.

In this step, a traversing process of increasing the width of the groove is performed in the grooving process.

Figure 20C:
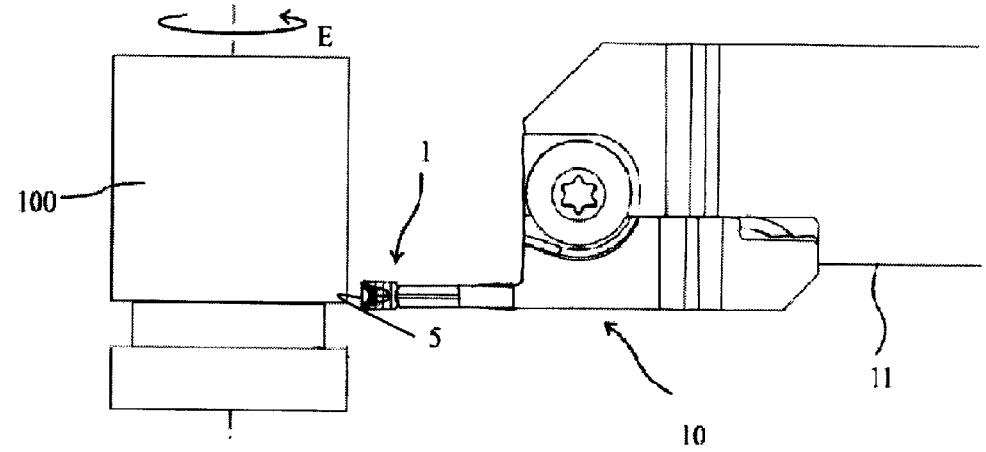
FIG. 20C is a schematic view showing the method of producing a machined product according to the second embodiment of the present invention.

The step (v) is to separate the cutting tool 10 from the workpiece 100 after being cut, as shown in FIG. 20C.

Figure 20D:
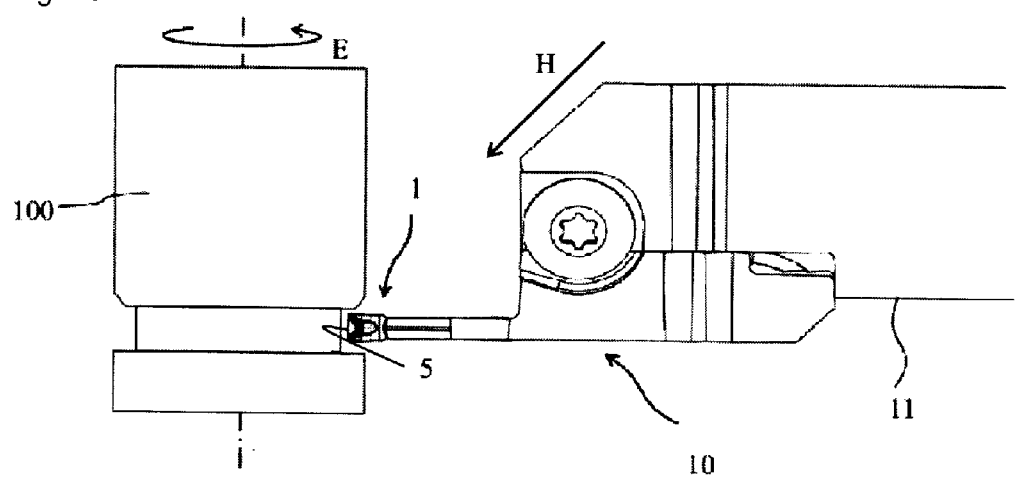
FIG. 20D is a schematic view showing the method of producing a machined product according to the second embodiment of the present invention.

The step (vi) is to move the cutting tool 10 in an arrowed direction H and bring the cutting edge 5 of the cutting tool 10 into contact with the workpiece 100 being rotated so as to cut the workpiece 100 as shown in FIG. 20D.

In this step, the workpiece 100 and the cutting tool 10 need to depart from each other. For example, the workpiece 100 may be separated from the cutting tool 10.

The step (vii) is to move the cutting tool 10 in the opposite direction of the arrowed direction F1 so as to separate the cutting tool 10 from the workpiece 100.

The machined product is obtainable by performing the foregoing steps (i) to (vii).

Also in the present embodiment, as described earlier, the pair of minor protrusions are located further apart from the end cutting edge than the end portion of each of the pair of major protrusions which is close to the end cutting edge, and the top portion of each of the pair of minor protrusions is lower than the top portion of each of the major protrusions. This ensures that the chips generated by the end cutting edge in the grooving process of the steps (i) to (v) are discharged after being deformed so that the portions of the chips brought into contact with the pair of major protrusions are upheaved.

At that time, the pair of minor protrusions are further apart from the end cutting edge and have a smaller height than the pair of major protrusions, and hence the pair of minor protrusions have little contribution to the processing of the chips, thereby suppressing the fracture of the pair of minor protrusions. In the chamfering process in the subsequent steps (vi) and (vii), even when the chips generated in the region of the end portions of the end cutting edge are not brought into contact with the major protrusions, the chips are stably dischargeable because the chips are deformed upon contact with the minor protrusions.

In the present embodiment, the foregoing steps (i) to (v) are optional, and the step (vi) and (vii) may be performed from a state in which the step (v) is terminated.

Other features are similar to those of the method of producing the machined product according to the first embodiment, and hence the descriptions thereof are omitted.

While the embodiments of the present invention have been illustrated, the present invention is not limited to the foregoing embodiments. The present invention is applicable to any optional one unless departing from the gist of the present invention.

For example, in the foregoing embodiments the rake angle $\alpha 1$ of the end rake surface $21a$ is approximately constant. Instead of this, the rake angle $\alpha 1$ of the end rake surface $21a$ may be changed as departing from the end cutting edge $5a$. For example, the rake angle $\alpha 1$ may be set to be smaller in the region between the pair of major protrusions $22a$ than the region between the end cutting edge $5a$ and the pair of major protrusions $22a$. Alternatively, the rake angle $\alpha 1$ may be set to be smaller in the region between the pair of intermediate protrusions $22b$ than the region between the pair of major protrusions $22a$. These configurations ensure that the chips are deformable so as to be smoothly curled as departing from the end cutting edge $5a$, thereby improving the chip discharge performance.

DESCRIPTION OF THE REFERENCE NUMERAL

1: cutting insert
2: upper surface
21: rake surface
$21a$: end rake surface
$21a1$: first region
$21a2$: second region
$\alpha 1$: rake angle
$21b$: side rake surface
$\alpha 2$: rake angle 21c: corner rake surface
22: protrusion
22a: major protrusion
β1: climbing angle
θ1: inclination angle
22b: intermediate protrusion
β2: climbing angle
θ2: inclination angle
22c: rear protrusion
22ca: ascent portion
β3: climbing angle
22d: minor protrusion
β4: climbing angle
θ4: inclination angle
23: rising surface
24: boundary region (flat surface)
26: attachment surface
3: lower surface
4: side surface
4a: front clearance surface
4b: side clearance surface
4c: corner clearance surface
5: cutting edge
5a: end cutting edge
5b: side cutting edge
5c: corner cutting edge
6: through hole
I: cutting section
II: mounting section (clamp section)
10: cutting tool
11: holder
12: fixing member (screw)
100: workpiece

The invention claimed is:

1. A cutting insert, comprising:
an upper surface;
a side surface comprising a front clearance surface and a pair of side clearance surfaces adjacent to the front clearance surface;
an end cutting edge located along an intersection of the upper surface and the front clearance surface; and
a pair of side cutting edges respectively located along intersections of the upper surface and the pair of side clearance surfaces,
wherein the upper surface comprises
an end rake surface that is continuous With the end cutting edge and is inclined downward as departing from the end cutting edge,
a pair of major protrusions that are located apart from the end cutting edge and are less apart from each other as departing from the end cutting edge in a top view, and
a pair of minor protrusions that are respectively located close to their adjacent side clearance surface of the pair of side clearance surfaces with respect to the pair of major protrusions in the top view, and
wherein the pair of minor protrusions are located further apart from the end cutting edge than an end portion of each of the pair of major protrusions which is close to the end cutting edge, and a top portion of each of the pair of minor protrusions is lower than a top portion of each of the major protrusions.

2. The cutting insert according to claim 1, wherein the pair of minor protrusions are less apart from each other as departing from the end cutting edge.

3. The cutting insert according to claim 2, wherein an inclination angle of the pair of minor protrusions is larger than an inclination angle of the pair of major protrusions with respect to a reference line that is a perpendicular line of the end cutting edge and passes through a midpoint of the end portions of the pair of major protrusions which are close to the end cutting edge, in the top view.

4. The cutting insert according to claim 1, wherein the upper surface further comprises a pair of intermediate protrusions that are at least partially located in a region further apart from the end cutting edge than the pair of major protrusions in the top view.

5. The cutting insert according to claim 4, wherein an inclination angle of the pair of intermediate protrusions is smaller than an inclination angle of the pair of major protrusions with respect to a reference line that is a perpendicular line of the end cutting edge and passes through a midpoint of the end portions of the pair of major protrusions which are close to the end cutting edge, in the top view.

6. The cutting insert according to claim 1,
wherein the pair of major protrusions and the pair of minor protrusions are inclined upward as departing from the end cutting edge, and
wherein a climbing angle of the pair of major protrusions is larger than a climbing angle of the pair of minor protrusions.

7. The cutting insert according to claim 1, further comprising a pair of corner cutting edges that are respectively located between the end cutting edge and the pair of side cutting edges and have a curvilinear shape in the top view.

8. The cutting insert according to claim 7, wherein at least a part of a bisector of an angle formed by an extension line of the end cutting edge and extension lines of the pair of side cutting edges passes through between the pair of major protrusions and the pair of minor protrusions in the top view.

9. The cutting insert according to claim 7, wherein the upper surface further comprises a pair of corner rake surfaces that are respectively continuous with the pair of corner cutting edges and are respectively inclined downward as departing from the pair of corner cutting edges.

10. The cutting insert according to claim 1, wherein the upper surface further comprises a pair of side rake surfaces that are respectively continuous with the pair of side cutting edges and are respectively inclined downward as departing from the pair of side cutting edges.

11. The cutting insert according to claim 10, wherein the pair of side rake surfaces are located closer to the end cutting edge than the rear protrusion in the top view.

12. The cutting insert according to claim 1, wherein the pair of major protrusions are continuous with the end rake surface.

13. The cutting insert according to claim 12, wherein one end of the end rake surface extends to a location further apart from the end cutting edge than the pair of major protrusions.

14. A cutting tool, comprising:
the cutting insert according to claim 1; and
a holder configured to attach the cutting insert thereto.

15. A method of producing a machined product, comprising:
bringing any one of the end cutting edge, the pair of side cutting edges, and the corner cutting edge of the cutting tool according to claim 14 into contact with a workpiece being rotated; and
separating the cutting tool from the workpiece.

* * * * *